Feb. 17, 1953
W. A. SCHAICH
2,628,536
GAS-OPERATED AUTOMATIC FIREARM
WITH FORWARDLY MOVING BARREL
Filed Oct. 10, 1945
11 Sheets-Sheet 1
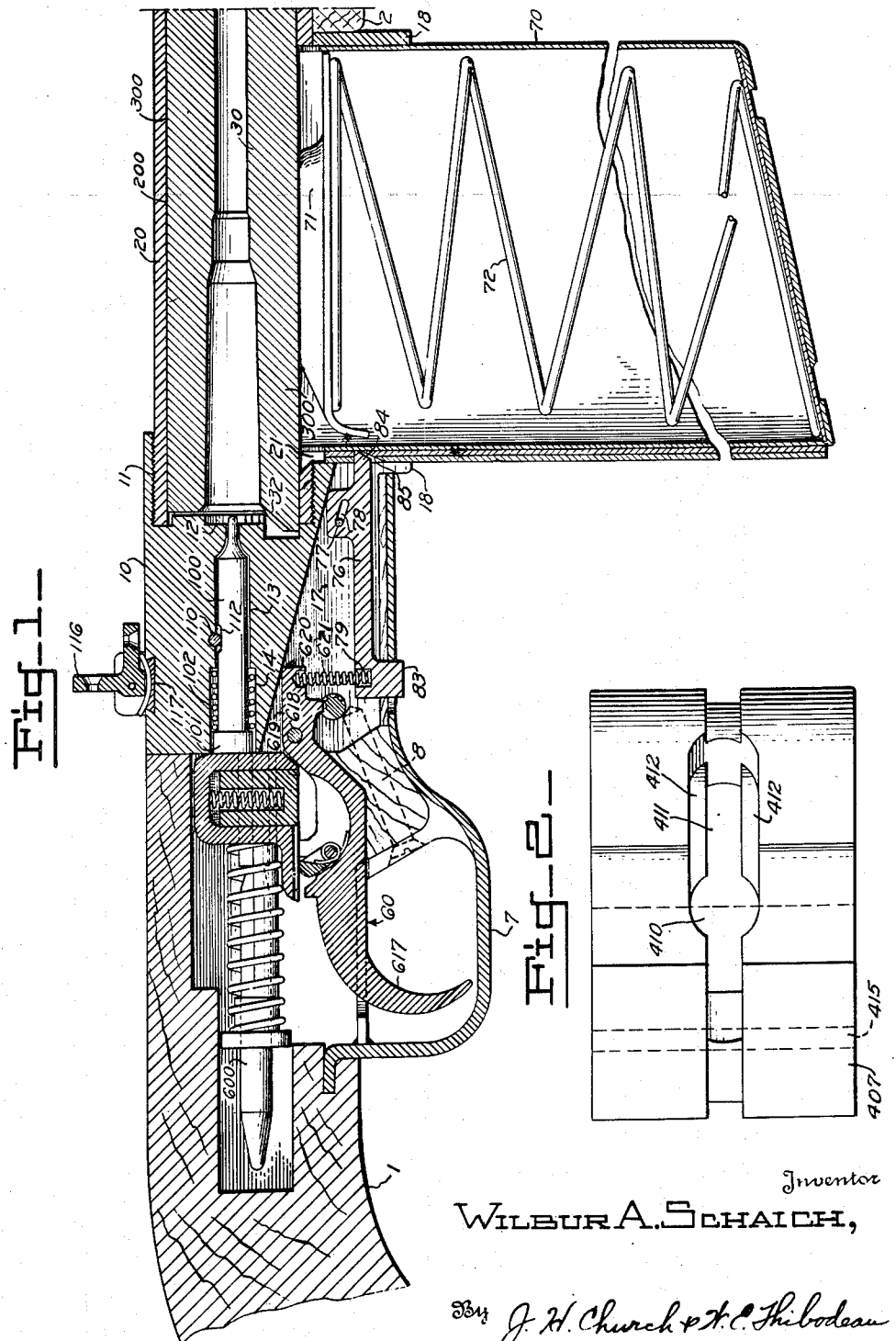
Inventor
WILBUR A. SCHAICH,
By J. H. Church & W. E. Thibodeau
Attorneys

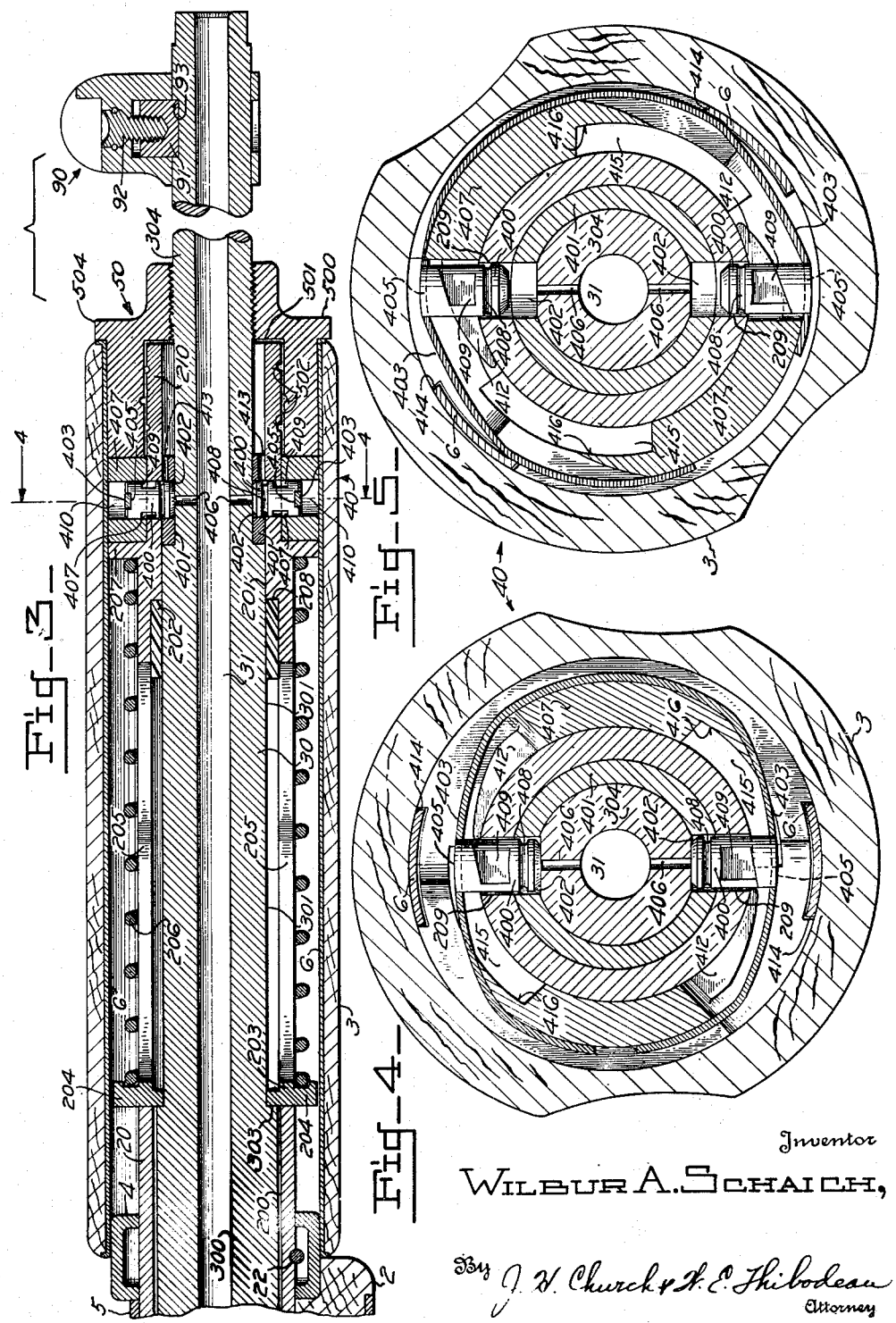

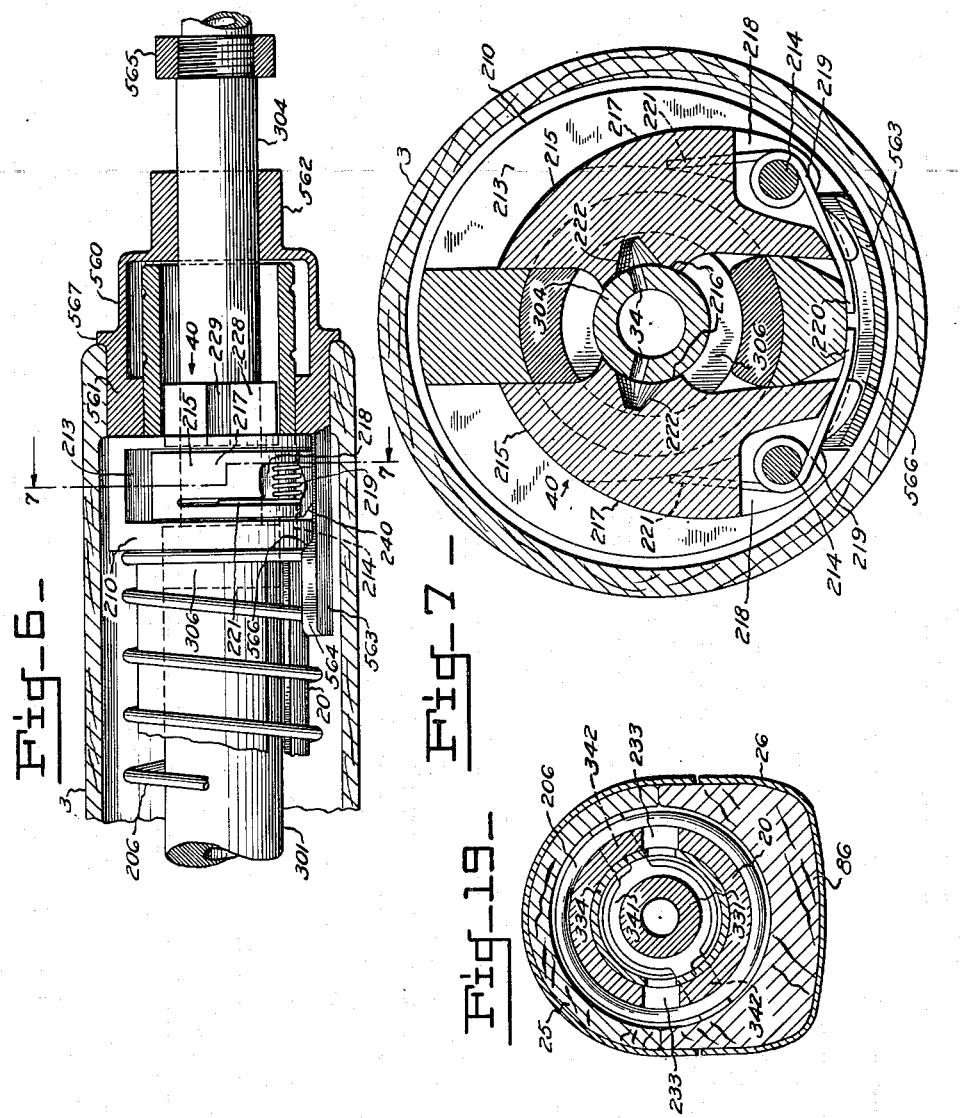

Feb. 17, 1953
W. A. SCHAICH
2,628,536
GAS-OPERATED AUTOMATIC FIREARM
WITH FORWARDLY MOVING BARREL
Filed Oct. 10, 1945
11 Sheets-Sheet 4
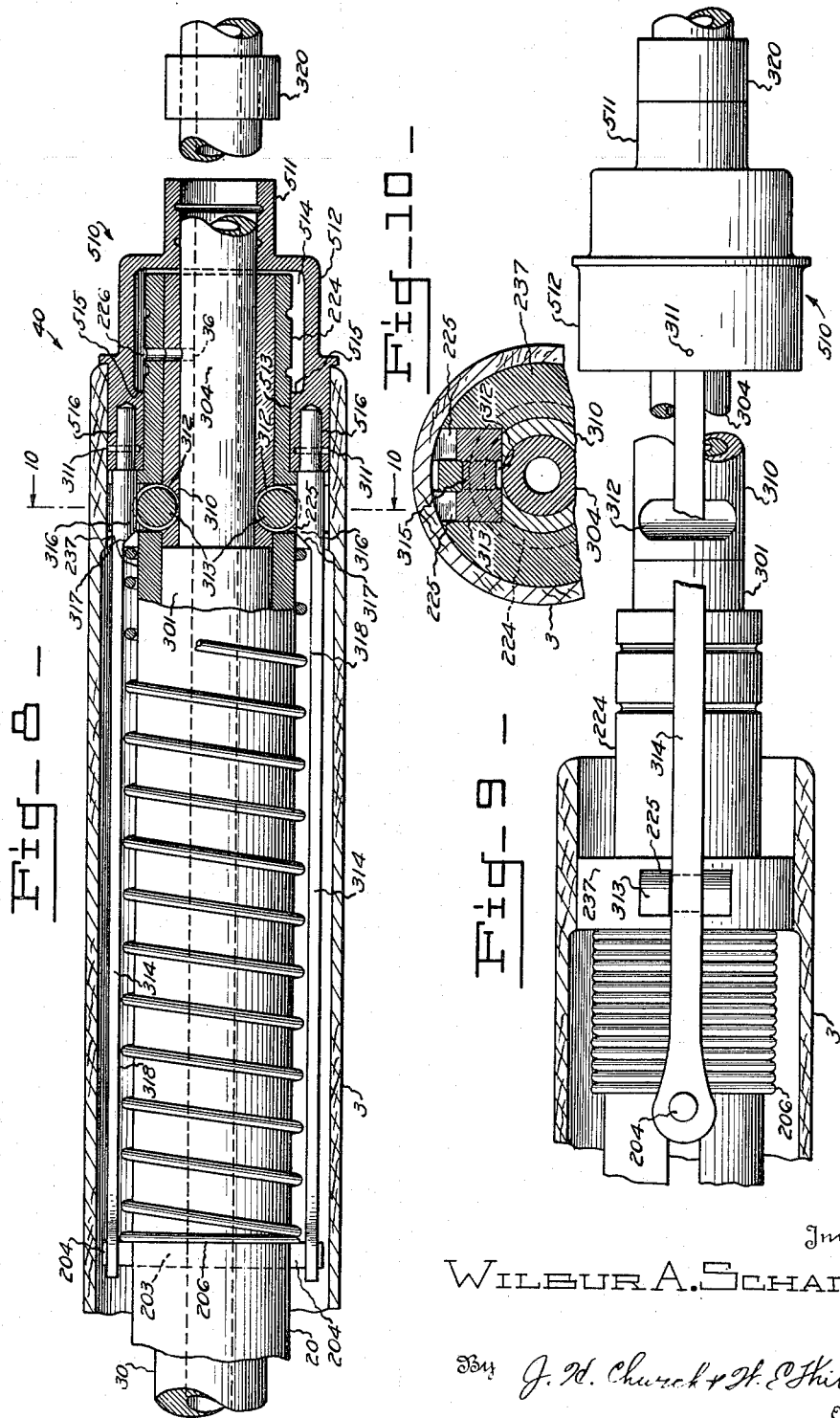
Inventor
WILBUR A. SCHAICH,
By J. N. Church & W. E. Thibodeau
Attorneys

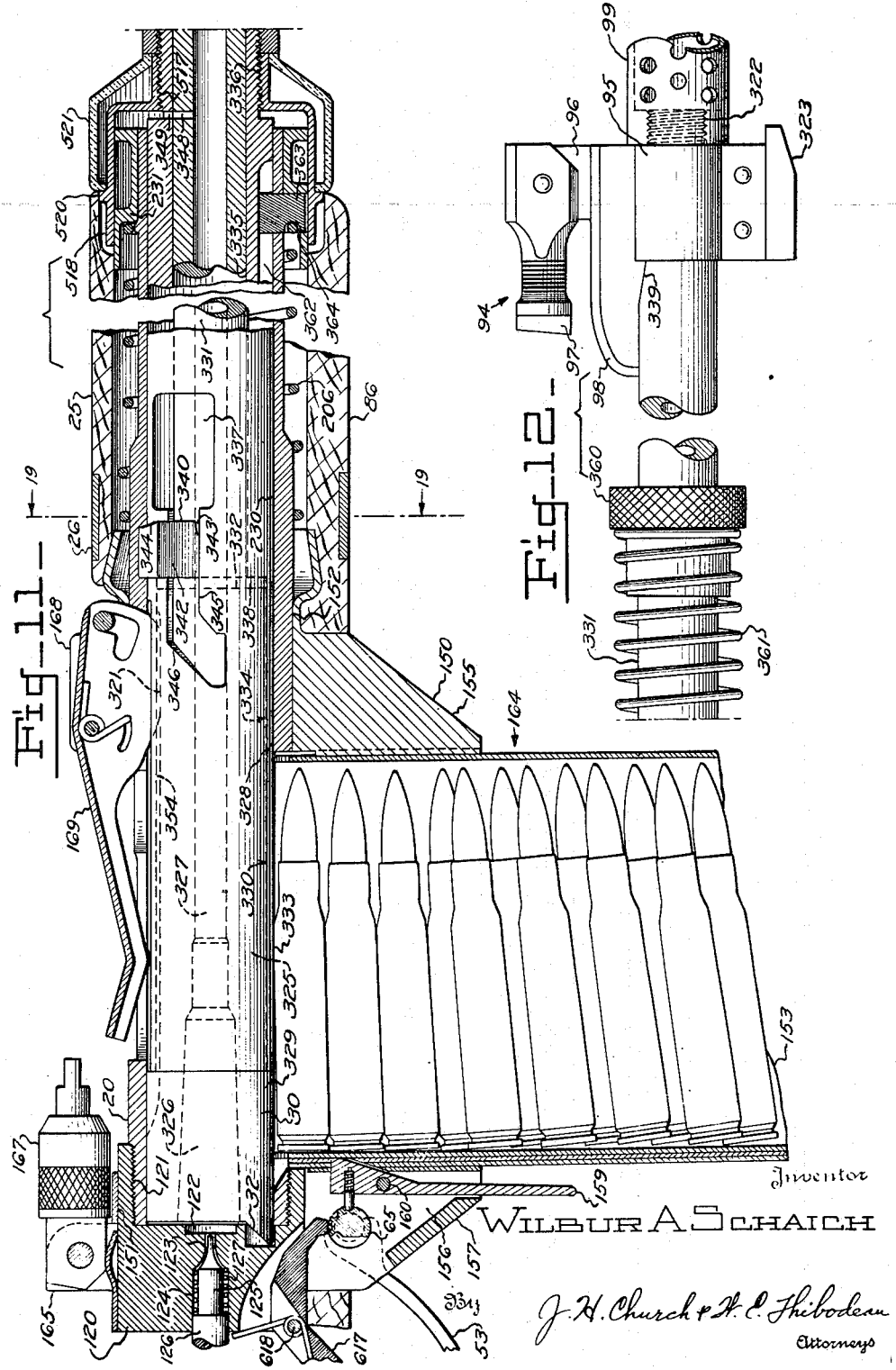

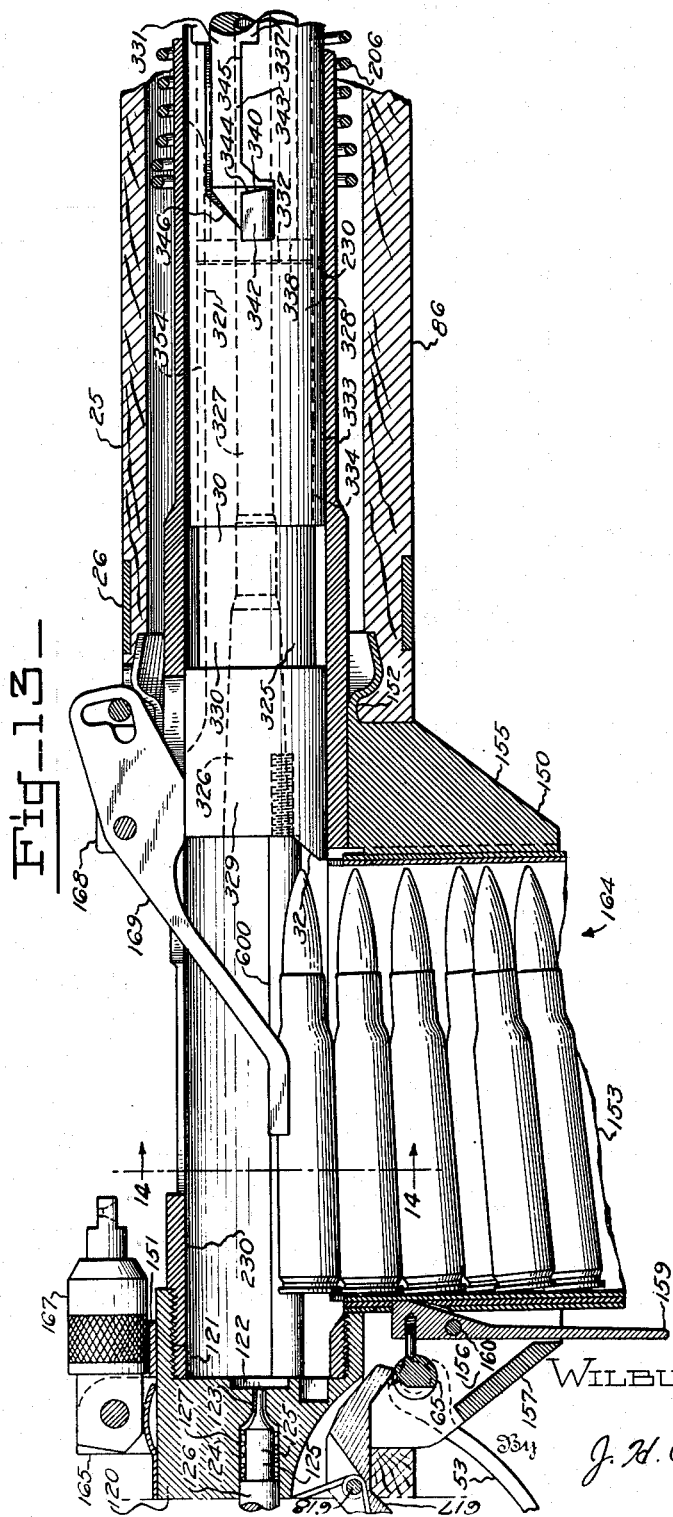

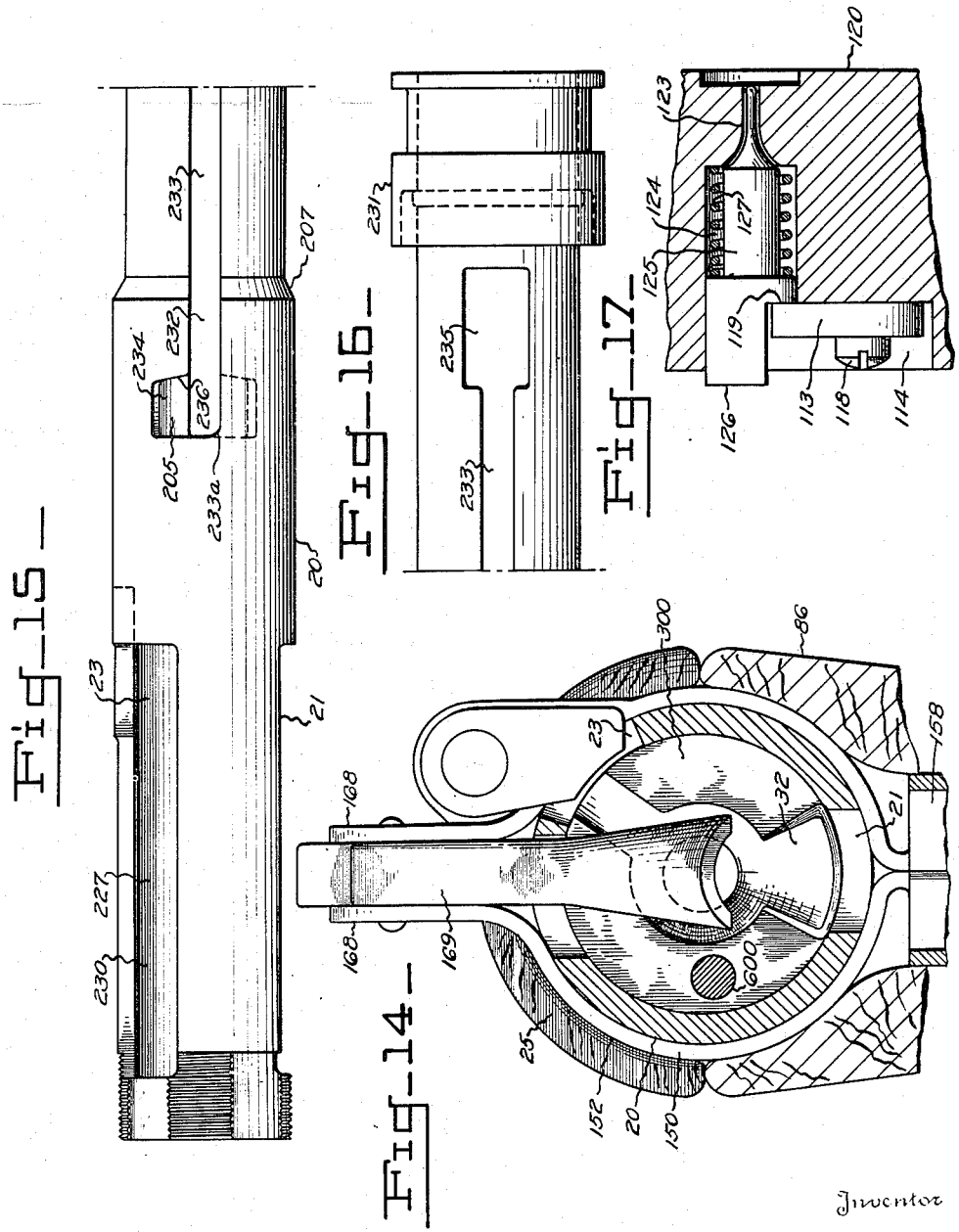

Feb. 17, 1953 — W. A. SCHAICH — 2,628,536
GAS-OPERATED AUTOMATIC FIREARM WITH FORWARDLY MOVING BARREL
Filed Oct. 10, 1945 — 11 Sheets-Sheet 8
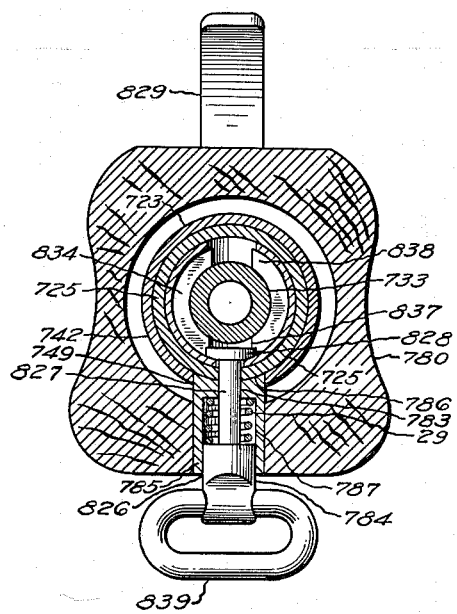
Fig_23_
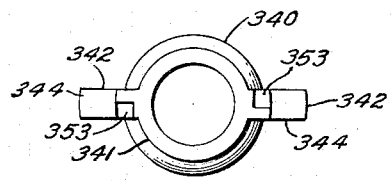
Fig_18_
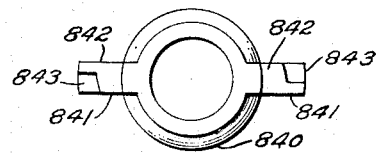
Fig_25_
Inventor
WILBUR A. SCHAICH,
By J. H. Church + H. E. Thibodeau
Attorneys

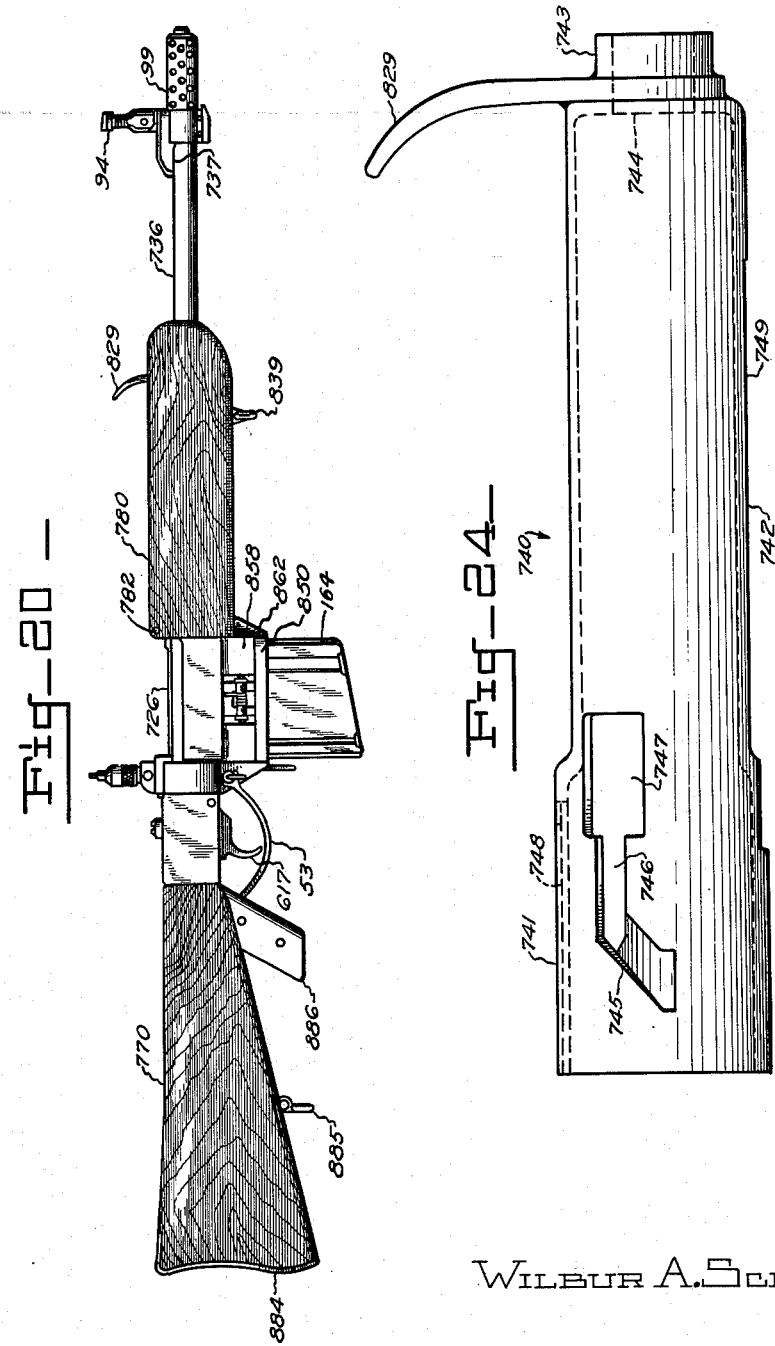

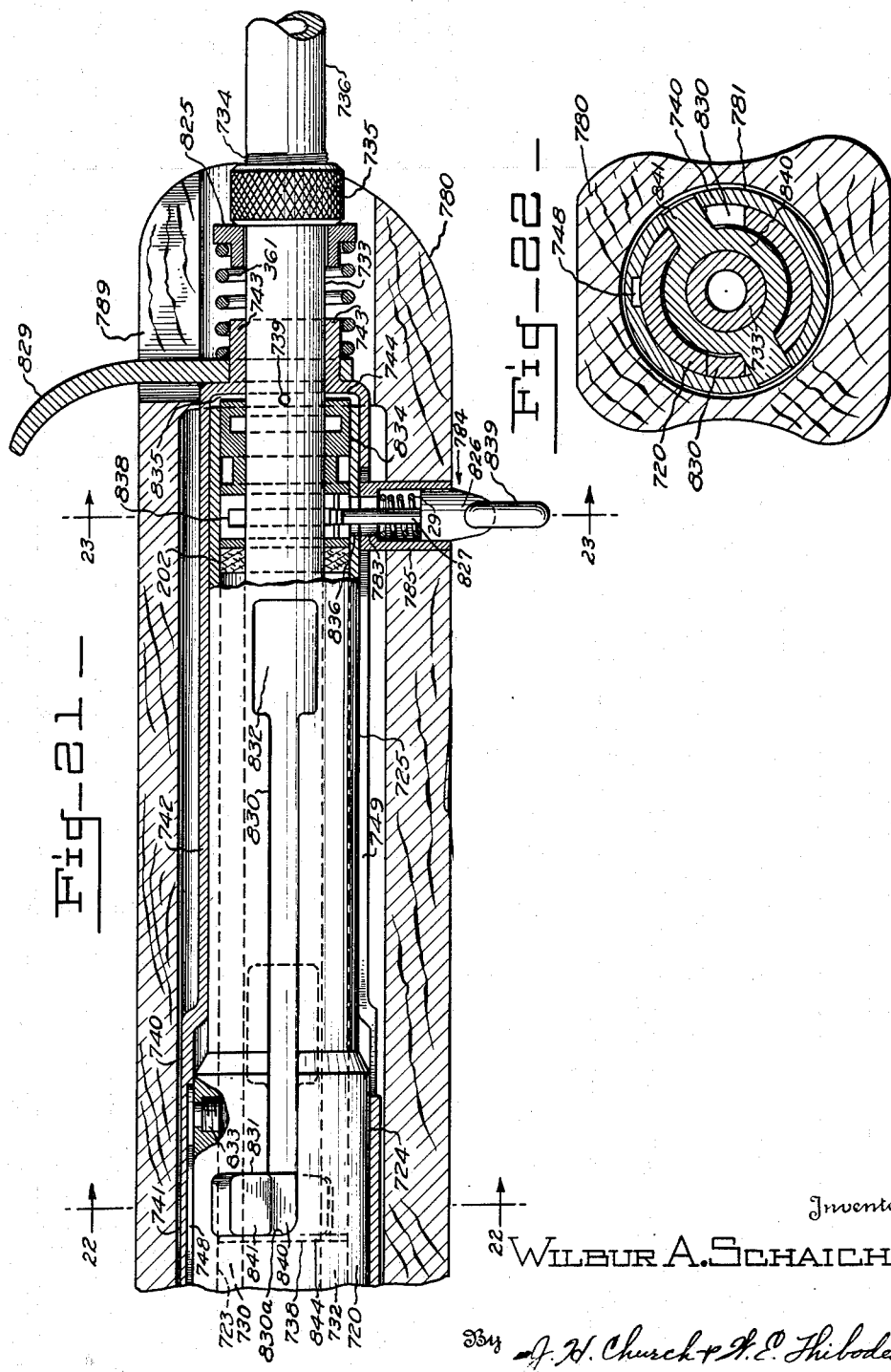

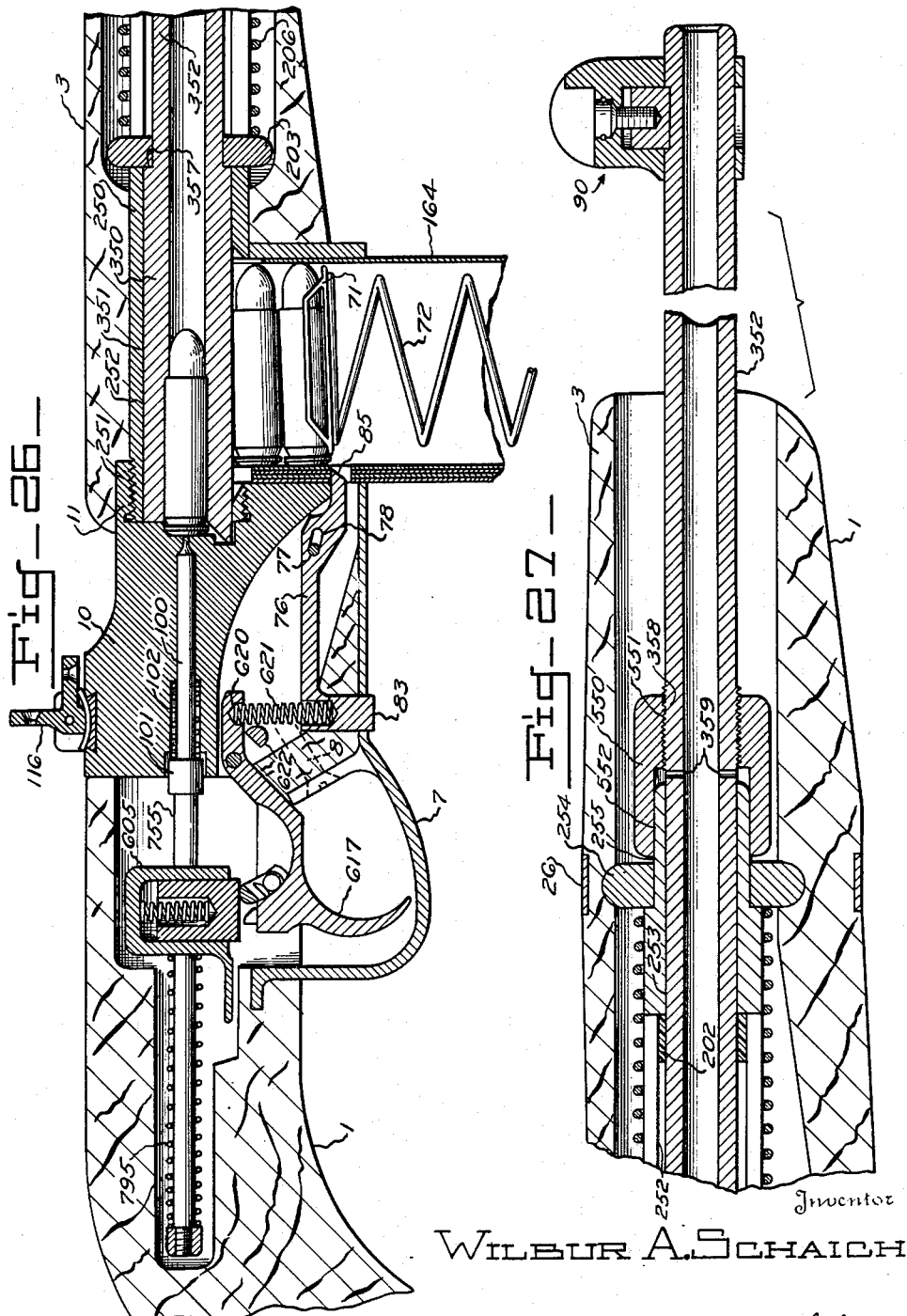

Patented Feb. 17, 1953

2,628,536

UNITED STATES PATENT OFFICE 2,628,536

GAS-OPERATED AUTOMATIC FIREARM
WITH FORWARDLY MOVING BARREL

Wilbur A. Schaich, Springfield, Mass.

Application October 10, 1945, Serial No. 621,647

45 Claims. (Cl. 89—159)

(Granted under Title 35, U. S. Code (1952),
sec. 266)

The invention described herein may be manufactured and used by or for the Government for governmental purposes without the payment to me of any royalty thereon.

This invention relates to improvements in firearms and particularly to automatic firearms wherein the barrel is arranged to move forwardly with respect to the fixed elements of the firearm.

Manually operated firearms utilizing a barrel arranged to move forwardly with respect to fixed breech elements have long been known in the art. An action of this type has also been applied to an automatic firearm for a low-powered cartridge, such for example, the type fired in pistols, as evidenced by the disclosure of U. S. Patent No. 1,376,456, issued May 3, 1921, to Moore. Heretofore, however, there apparently has been no successful application of the forward moving barrel action to an automatic firearm designed for a high-powered cartridge, such for example, as U. S. Army, caliber .30, M1906.

It has been discovered by the inventor of this application that an action based upon a forward moving barrel can be expeditiously applied to an automatic firearm designed to fire a high-powered cartridge, providing a firearm structure of utmost simplicity and improved safety in performance. The improved results obtained by such construction are, in a large measure, based upon discovery of a fundamental principle applicable only to a firearm action having a fixed breech and a forwardly moving barrel and which does not apply to conventional type firearms where the breech member is movable with respect to the barrel.

This principle, which heretofore has apparently been unappreciated, has been thoroughly demonstrated and proved by experiment. Concisely stated, it has been discovered that the resultant force developed on the barrel by the firing of a cartridge therein, when the barrel is considered independently of the breech mechanism, is a force acting in a forward direction and such force is substantially less than, and, in fact, only a fraction of the rearward force exerted on the breech mechanism through the base of the cartridge.

Thus, if the locking mechanism of the automatic firearm action is designed to resist the forward force on the barrel rather than the rearward force on the bolt, then the strength required for such locking mechanism is substantially reduced.

It has been heretofore believed necessary that the locking mechanism which normally resists rearward movement of the bolt be located as near as possible to the face of such bolt to eliminate increase of headspace caused by stretch of the metal parts disposed between the bolt face and the point of locking due to the very large rearward force set up by the firing of a cartridge. In accordance with this invention, the locking mechanism may be located out on the barrel and well forward of the chamber. Thus the locking mechanism may be located immediately adjacent a gas port in the barrel and, hence, there is no necessity for the long operating rod found in conventional actions running between the gas system on the barrel and the movable breech member. Consequently, simplicity of structure is obtained by the application of this invention. In addition, since the entire inertia mass of the barrel opposes the opening of the breech, an unlocking mechanism incorporating little or no dwell time may be utilized with safety, so long as the gas port in the barrel actuating the unlocking mechanism is located forwardly of the barrel region wherein maximum gas pressure occurs.

Another long recognized defect of conventional automatic weapons, and particularly the gas operated, movable bolt type weapons, is that the cyclic rate of such weapons is excessively high. Such high cyclic rate when firing full automatic greatly disturbs the accuracy of firing and produces extreme rapid heating of the barrel, thereby effectively limiting the length of burst that may be fired to 200 rounds or less. Even when conventional weapons were fired semi-automatically, an inherent high cyclic rate produced extreme acceleration of the moving parts of the mechanism (particularly the operating rod and the bolt) and high impact forces resulted when the mechanism reached the ends of its stroke.

In accordance with this invention, the barrel constitutes the major moving element of the mechanism. Obviously the weight of the barrel is many times that of the bolt of a conventional firearm. Since the cyclic rate of a gas operated automatic firearm is primarily dependent upon the mass of moving parts, it is readily apparent that an automatic firearm constructed according to this invention will have a cyclic rate which is substantially below that of a conventionally designed gas-operated firearm, hence reducing the impact stresses on all parts and making the gun more readily controllable in full automatic fire.

A further advantage of the structure achieved by the application of this invention is that its simplicity would permit a substantial over-all reduction in weight of the firearm if the barrel mass was selected substantially the same as the conventional firearm. It is, therefore, possible by the application of this invention to utilize a heavier barrel without increasing the weight of the weapon over that of conventionally designed firearms. Accordingly, the cyclic rate of the improved firearm is still further decreased and the heat capacity of the barrel increased. Both of these factors are particularly important in weapons designed for military purposes.

In addition, in the preferred embodiments of this invention substantially 75 percent or more of the entire mass of the firearm is disposed in surrounding, and hence in good heat conducting relation to the barrel, thus further increasing the heat dissipating ability of the barrel.

Accordingly it is an object of this invention to provide an improved automatic firearm composed of simple, readily manufacturable parts and providing reliable operation, long endurance life, and complete safety of operation.

Another object of this invention is to provide an improved firearm of the automatic type wherein the breech member is fixed and the barrel moves forwardly with respect thereto.

A particular object of this invention is to provide an improved gas operated automatic firearm having a barrel movable forwardly with respect to the breech wherein the locking mechanism between the breech and barrel is located at an intermediate point on the barrel and immediately adjacent the gas port in the barrel.

A further object of this invention is to provide an improved automatic firearm structure wherein the barrel moves forwardly with respect to a fixed breech member and the residual gas pressure operates directly on the barrel to assist in such forward movement.

A further object of this invention is to provide an automatic firearm construction wherein the barrel moves forwardly with respect to the breech and the need for any locking mechanism is eliminated by proper proportioning of the mass of the barrel and associated components.

A further object of this invention is to provide an improved automatic firearm construction, characterized by the simplicity and small number of its components, which is susceptible of large quantity economical manufacture inasmuch as practically all components are of cylindrical configuration or can be produced by stamping operations.

As heretofore stated, this invention is based upon the discovery that the locking force required to lock a forwardly movable barrel to a fixed breech when firing a high-powered cartridge was much less than the force required to lock a conventional action utilizing a rearwardly movable bolt locked to a fixed or rearwardly movable barrel. The small magnitude of the forces required to lock a forwardly movable barrel to a fixed breech may be readily determined by analysis. Considering first a barrel chambered to fire a straight case, it is readily apparent that when the barrel is considered as an element separate from the breech member that the only forces operative thereon are the following:

1. A forward force on the barrel exerted by the projectile during its initial movement when it is being engraved by the lands of the rifling of the barrel. This force exists generally for a period on the order of a ten-thousandth of a second duration.

2. A forward force on the barrel produced by the frictional drag of the projectile on the barrel. It is deemed obvious that this force is of a very small magnitude once the engraving is accomplished, although it exists for the entire time that the projectile is in the barrel.

3. A forward force on the barrel represented by the forward component of the reaction force produced between the helical-shaped lands and the projectile. This force may be readily calculated for any particular cartridge and barrel knowing the muzzle velocity of the projectile, the barrel time of the projectile and the twist of the rifling.

4. A rearward force on the barrel produced by the reaction of the gases issuing from the muzzle upon the barrel.

When a so-called bottle-neck cartridge case is utilized, which is the construction commonly found in high-powered cartridges, such, for example, as the U. S. Army cal. .30, M1906, then an additional component of force is produced on the barrel. This force is produced by the action of the gas pressure within the barrel upon the resultant rearwardly facing area of the cartridge case. This area generally comprises the difference in interior area of the base of the cartridge and the maximum cross-sectional area of the projectile.

Adding all of the described forward forces together, the result for any commonly known cartridge and barrel is a resultant forward force on the barrel which is 25 to 75 percent less than the rearward force exerted by the same cartridge upon the breech member.

It has already been mentioned that a firearm action built around a forwardly movable barrel results in a simplified design and hence an appreciable saving in weight of the complete firearm. In accordance with this invention a much greater percentage of the mass of the gun may be incorporated on the barrel. This will be recognized to those skilled in the art as a most desirable condition inasmuch as the mass of the barrel is really the most essential mass of the gun. The heavier the barrel, obviously the greater is its ability to absorb heat produced by firing. However, in the application of this invention, the increase in mass of the barrel has the additional advantage of decreasing the size of the locking element. The barrel mass, in a sense, constitutes the "blow-back" mass of the gun. Thus for any medium-powered cartridge, for example, the U. S. carbine cal. .30, M1, an action constructed in accordance with this invention, utilizing a forwardly movable barrel with as much mass built into the barrel as consistent with the overall weight requirements of the weapon, requires no locking system at all, or at the most, merely a non-positive, delay lock. The reduction in the force operating to separate the barrel from the breech, coupled with the large mass of the barrel resisting acceleration of the barrel by such forces, insures that the barrel will not move substantially away from the breech until the pressure within the barrel has dropped to a safe value.

The specific nature of the invention as well as other objects and advantages thereof will clearly appear from a description of a preferred embodiment as shown in the accompanying drawings in which:

Fig. 1 is a longitudinal sectional view of the rear portion of an automatic firearm embodying this invention. The firearm is shown with the hammer mechanism in its fired position and the barrel in battery position.

Fig. 2 is a top elevational view of the unlocking ring utilized in the firearm construction of Fig. 1.

Fig. 3 is a longitudinal sectional view of the front portion of the firearm shown in Fig. 1.

Fig. 4 is an enlarged sectional view of Fig. 3 taken on the plane 4—4 and showing the locking elements in their battery positions.

Fig. 5 is a view similar to Fig. 4 but showing the locking elements in their manually unlocked position.

Fig. 6 is a longitudinal sectional view of the forward end of a firearm similar to that shown in Fig. 1, showing an alternative "jet action" type of locking mechanism.

Fig. 7 is a sectional view taken on the plane 7—7 of Fig. 6.

Fig. 8 is a longitudinal sectional view of the forward end of a firearm similar to that shown in Fig. 1, showing an alternative roller type of locking mechanism.

Fig. 9 is a view similar to Fig. 8 but showing the elements in their counter-battery positions.

Fig. 10 is a partial sectional view of Fig. 8 taken along the plane 10—10.

Fig. 11 is an enlarged scale longitudinal sectional view of the breech portion of a firearm embodying a second modification of this invention shown with the elements thereof in their battery positions.

Fig. 12 is a continuation of Fig. 11 showing the forward end of the barrel.

Fig. 13 is a view similar to Fig. 11 but showing the elements of the firearm in their counter-battery position.

Fig. 14 is an enlarged sectional view of Fig. 13 taken along the plane 14—14 thereof. For clarity, the magazine and cartridges have not been shown in this view.

Fig. 15 is a side elevational view of the tube or receiver utilized in the firearm of Fig. 11.

Fig. 16 is a continuation of Fig. 15 showing the forward end of the tube.

Fig. 17 is a fragmentary sectional view of the breech block showing the retaining washer for the firing pin.

Fig. 18 is an elevational view of the locking element utilized in the firearm of Fig. 11.

Fig. 19 is a sectional view taken along the plane 19—19 of Fig. 11.

Fig. 20 is an elevational assembly view of an automatic firearm embodying a third modification of this invention.

Fig. 21 is also an enlarged scale, longitudinal, sectional view of the firearm of Fig. 20 showing the forward portion of the firearm mechanism.

Fig. 22 is a sectional view taken along the plane 22—22 of Fig. 21.

Fig. 23 is a sectional view taken along the plane 23—23 of Fig. 21.

Fig. 24 is an enlarged scale, elevational view of the operating sleeve utilized in the firearm of Fig. 20.

Fig. 25 is an enlarged scale, elevational view of the locking element utilized in the firearm of Fig. 20.

Fig. 26 is a horizontal, sectional view of the breech portion of an automatic firearm embodying a modification of this invention, characterized by the elimination of any locking elements.

Fig. 27 comprises essentially a forward extension of the view of Fig. 26.

Referring to the drawings a number of specific applications of this invention will be described but it should be understood that the novel design principles incorporated therein are equally applicable to any type of automatic firearm and may be applied to produce an improved automatic firearm action for any cartridge.

*Gas operated, positive lock, automatic rifle*

Referring to Figs. 1-5 there is shown an automatic rifle embodying this invention comprising a stock 1, a fixed breech member 10 mounted in said stock, a hollow guide member or tube 20 secured at its rear end to the breech member 10, a barrel 30 reciprocatingly mounted within tube 20 for forward movement with respect to breech block 10, a locking unit 40 (Fig. 3) constructed to lock the barrel to the breech in battery position thereof and to unlock the barrel responsive to the gas pressure developed therein by the discharge of a cartridge, a gas actuating mechanism 50 constructed to move the barrel forwardly after it has been unlocked from the breech, a hammer and trigger mechanism 60 for firing a cartridge chambered in the barrel 30, and a magazine 70 for supplying successive cartridges to the action.

Breech block 10 is provided with a forwardly opening, cup-shaped, threaded recess 11 in the forward portion thereof into which the end of tube 20 is threadably secured. The cooperating threads between tube 20 and recess 11 are preferably of the interrupted type, permitting tube 20 to be assembled to breech block 10 by a rotation of 90 degrees or less.

The central portion of the base of recess 11 is countersunk to form a cartridge seating recess 12. An axial opening 13 is provided through breech block 10, opening in the center of the cartridge seating recess 12 and shaped to accommodate a firing pin 100. Firing pin opening 13 is counterbored at its rear portion, indicated at 14, to accommodate an enlarged head portion 101 of firing pin 100. A retracting spring 102 surrounds the body portion of firing pin 100 and seats between the base of the counterbore 14, and the head 101 of the firing pin. Firing pin 100 is retained within breech block 10 by means of a pin 110 which passes transversely through a slot 112 provided on the exterior of firing pin 100.

A longitudinally extending slot 17 is provided in the bottom portion of breech block 10 to house a trigger 617 and magazine latch 76. Breech block 10 is also provided with an integral, forwardly projecting portion 18 which defines a rectangular opening through which magazine 70 may be inserted.

The receiver or tube 20, which acts as a guide for the reciprocal movement of barrel 30, extends forwardly from the breech block 10 to a distance preferably not less than one-third of the length of barrel 30. The tube 20 defines a rear uniform large diameter cylindrical bore 200 in which the rear large diameter portion 300 of barrel 30 slides in bearing relation. A magazine slot 21 is provided in the bottom of the tube to receive a magazine 70. The forward portion 210 (Fig. 3) of tube 20 has somewhat thicker walls and defines a cylindrical bore 201 of smaller diameter than the bore portion 200 but concentric therewith, and a forward reduced diameter portion 301 of the barrel cooperates with portion 201 of the tube in bearing relation. An annular buffer 202 is provided sliding freely around barrel portion 301 and within tube portion 200. A shoulder 303 is defined at the juncture of the two diameter portions 300 and 301 of the barrel. A spring retainer 203 is provided comprising an annular member which surrounds barrel portion 301 and abuts against barrel shoulder 303. A pair of integral radial projections 204 are provided on spring retainer 203 in diametric relationship which project out through a pair of longitudinal slots 205 provided in tube 20 in opposed relationship. The width of the slots 205 is suitably proportioned with respect to the spring retainer 203 so that spring retainer 203 may be inserted in its flat position into the interior of tube 20 through the slots 205 and then rotated 90 degrees to bring it into its operative position.

An operating spring 206 surrounds tube 20 and operates between an integral shoulder 207 on the forward end of tube 20 and the projections 204 of spring retainer 203. It will be obvious that spring 206 thus biases the barrel rearwardly to its battery position with respect to the breech block 10. The forward stroke of the barrel is limited by engagement of spring retainer 203 with buffer 202 when the buffer 202 is abutting the interior shoulder 208 formed at the juncture of interior diameter portions 200 and 201 of the tube. It should be noted that the exterior shoulder 207 on the tube is located sufficiently forward of the extreme forward position of spring retainer 203 to provide adequate space for the compressed operating spring 206.

As has heretofore been stated, one of the principal advantages of the application of this invention is that the locking forces are so reduced that the locking elements may be locked at a point out on the barrel immediately adjacent the gas port.

In Figs. 3, 4, and 5 there is disclosed one form of locking mechanism while in Figs. 6, 8, 11, and 21, alternative forms are disclosed. Each form of locking mechanism however offers similar advantages of simplicity of structure, and reliability and safety of performance and is particularly effective with the forward moving barrel construction inasmuch as the mechanism can be located on the barrel in the vicinity of the gas port.

The locking mechanism 40 shown in Figs. 3–5 comprises a plurality of piston plugs 400 which are mounted in radially arranged holes 209 provided in the forward thick walled portion 210 of tube 20. In view of the fact that the steel generally utilized in firearm barrels is in a relatively soft condition and would deform when resisting locking forces, a locking ring 401 of hardened steel is pressed onto barrel 30. Locking ring 401 has the same exterior diameter as barrel portion 301 and is pressed over a forward reduced diameter end portion 304 of the barrel. Suitable radial holes 402 are provided in locking ring 401 to snugly receive the ends of piston plugs 400. It will be apparent that when piston plugs 400 are seated in holes 402, the barrel 30 will be rigidly locked to the tube 20 and hence to breech block 10. As heretofore mentioned, the locking force which the locking mechanism 40 is required to resist is so substantially reduced by the arrangement of this invention, that the tube 20 may be formed from relatively thin walled material and yet the stretch of the material lying between the point of locking and the face of the breech block will not detrimentally affect the safety of the action. Piston plugs 400 are biased toward their locking positions by means of an annular leaf type spring 403 which lies in a slot 405 provided in the outer ends of each of the piston plugs 400.

A plurality of gas ports 406 are provided in barrel 30 running radially from the center of each hole 402 in barrel locking ring 401 into the bore 31 of the barrel. Thus when a cartridge is fired and the projectile moves along the bore past gas ports 406, a portion of the gases will be diverted through ports 406 and will operate on the base of piston plugs 400, driving such plugs outwardly against the bias of spring 403 and hence unlocking the barrel from the breech. To reduce the gas leakage past piston plugs 400, an annular gas groove 408 may be provided on each piston plug.

In order that the action may be unlocked manually at any time, an unlocking ring 407 is provided which surrounds portion 210 of tube 20, abutting shoulder 207. A pair of opposed flats 409 are provided in the middle of each of the piston plugs 400. Unlocking ring 407 (Fig. 2) is provided with a plurality of radial holes 410 of diameter proportioned to freely accommodate the end portion respectively of each of piston plugs 400. Peripheral cam slots 411 are provided in unlocking ring 407 communicating with each of the holes 410. On each side wall of each cam slot 411 there is provided inwardly projecting cam ribs 412. The space between such cam ribs 412 will accommodate the flat portions 409 of the piston plugs 400. The cam ribs 412 are so arranged that by rotation of unlocking ring 407 with respect to tube 20 in a counterclockwise direction as viewed in Figs. 4 and 5, the cam ribs 412 will engage the outer shoulder formed by flats 409 on piston plugs 400 and cam each of such plugs outwardly to an unlocked position as shown in Fig. 5. Unlocking ring 407 is constructed to be rotated by movement of the handguard of the gun as will be later described.

The end of forward portion 210 of tube 20 is constructed to serve as a fixed piston member of the gas actuating mechanism 50. Gas actuating mechanism 50 comprises an annular gas cylinder 500 which is threadably secured to the forward portion 304 of the barrel and which defines a rearwardly opening, cup-shaped recess 501 constructed to slide in bearing relation on forward portion 210 of tube 20. To reduce gas leakage between these cooperating members, a plurality of gas grooves 502 may be provided in both the interior peripheral surface of recess 501 and the exterior of tube portion 210. Operating gases are supplied to the above described piston and cylinder arrangement by means of longitudinal grooves 413 provided in locking ring 401 immediately adjacent each of the lock holes 402. With this construction, it is obvious that no gas is supplied to the piston and cylinder arrangement until after the piston plugs are forced out of their locked position. The gases supplied to the gas actuating member 50 will then drive the gas cylinder 500 forwardly and hence carry the barrel 30 forwardly. The gas ports 406 and the gas grooves 413 are so proportioned as to provide sufficient gas to rapidly accelerate barrel 30 so that by the time gas cylinder 500 passes off the forward end of tube 20, the barrel will have sufficient momentum to complete its forward travel, compressing operating spring 206. However, the maximum velocity achieved by the barrel is substantially less than that required in conventional, movable bolt actions.

As has been previously mentioned, the magazine 70 is supported within the forwardly projecting portion 18 of breech block 10 and projects into the interior of tube 20 through slot 21. Magazine 70 comprises a sheet metal box having a conventionally arranged follower 71 and spring 72 therein and is constructed to support a double row stack of necked-down cartridges. The top portion and lips of magazine 70 (not shown) are, however, constructed in an entirely unique manner producing very desirable feeding conditions when utilized in conjunction with a forwardly moving barrel action. To facilitate the feeding operation, an integral ramp 32 is provided on the breech end of barrel 30. The base of the recess 11 of breech block 10 is cut away to provide a suitable recess 19 to accommodate the barrel ramp 32 in the battery position. The function of magazine 70 is to support the top cartridge in such position that barrel ramp 32 will pass under and engage the nose of such top cartridge. Accordingly, the forward wall of magazine 70 is provided with a cut-away portion (not shown) at the top of its forward wall to permit entry of the barrel ramp 32 under the nose of the top cartridge.

Magazine 70 is retained in position with respect to breech block 10 by means of magazine latch 76 which lies within the longitudinal slot 17 in breech block 10. Latch 76 is pivotally mounted by engagement of a fixed pin 77 in a slot-like hole 78 in the magazine latch 76. In the rearwardly extending portion of magazine latch 76, there is provided a spring seat recess 79. Trigger 617 is pivotally mounted at its forward end in the slot 17 in breech block 10 by a transverse pin 618. A portion 619 of the trigger extends forwardly beyond pin 618 and is provided with a spring-seat recess 620. A spring 621 is mounted between the spring-seat 620 in trigger 617 and the spring-seat recess 79 in magazine latch 76. An integral depending projection 83 is provided on magazine latch 76 which projects out of the breech block 10 in position to be engaged by the finger of the operator to permit release of the magazine. A latch portion 84 of magazine latch 76 engages in a suitable notch 85 on the side of magazine 70. The latch portion 84 is so shaped that when a magazine is being inserted into the magazine recess, the magazine latch 76 will be cammed rearwardly out of the path of the magazine until the notch 85 is aligned therewith.

The hammer mechanism for a firearm utilizing a forwardly moving barrel is substantially different from that of a conventional firearm. In the conventional firearm, the hammer is cocked by being over-ridden by the bolt in its rearward movement. In a firearm constructed in accordance with this invention, the only major moving element is the barrel and that is moving away from the rear of the breech block which is the necessary location of the hammer mechanism. In Fig. 1 a hammer mechanism 60 is shown which accomplishes its cocking during the return rearward movement of the barrel to battery position. This mechanism does not require much space rearwardly of the breech block and hence is particularly adaptable to a dropped stock construction.

To communicate the barrel movement to the hammer mechanism 60, a cocking rod 600 is provided, the forward end of which is threadably secured in the barrel. Hence cocking rod 600 serves to maintain the barrel at all times in fixed position with respect to the breech block 10.

The stock 1 is conventionally formed and is suitably recessed to accommodate breech block 10, tube 20, and hammer mechanism 60. The stock 1 preferably extends forwardly of the magazine support portion 18 of breech block 10, as indicated at 2. A trigger guard and floor plate 7 may be secured to stock 1 in any desired manner, such as by anchoring the rear end thereof in the wood of the stock and securing the forward end by a pair of screws 8 extending through the wood of the stock and threading into the bottom of breech block 10.

A wood or plastic handguard 3 (Fig. 3) is provided to cover that portion of the mechanism lying between the forward portion 2 of the stock and gas cylinder 500. A stock mounting ring 4 is provided surrounding tube 20 and secured thereto by a removable pin 22, and is engaged by both the forward portion 2 of the stock and the rear portion of the handguard 3. A conventional, screw tightened stock ferrule 5 is provided, surrounding the forward portion 2 of the stock 1 and securing it to mounting ring 4.

Handguard 3 essentially comprises a hollow cylindrical member and is arranged to slide in bearing relation with respect to the peripheries of mounting ring 4, unlocking ring 407, tube shoulder 207, and the rear portion of gas cylinder 500. To eliminate excessive wear on the wood or plastic material of the handguard, a plurality of spaced, longitudinal metallic strips 6 are secured to the interior of handguard 3. Suitable notches 414 (Figs. 4 and 5) to accommodate strips 6 are provided in the periphery of unlocking ring 407. Thus rotation of handguard 3 will rotate unlocking ring 407. Accordingly, unlocking of the action at any time is accomplished in a convenient manner by limited rotation of handguard 3. The forward end of handguard 3 abuts against an integral shoulder 504 provided on gas cylinder 500. Thus forward movement of handguard 3 will be imparted to the gas cylinder 500 and thus to the barrel 30. The action may therefore be manually functioned by a slight rotation of handguard 3 followed by a forward thrust of the handguard similar to the movement of pump action guns. This is particularly desirable in that the operator does not have to utilize his trigger hand nor take his eyes off the target.

In military rifles it is common practice to provide an adapter which fits over the muzzle end of the rifle to permit the launching of an explosive grenade therefrom by the action of high-pressure gases developed by the firing of a blank cartridge within the barrel. Grenade launching constitutes a severe problem for gas operated firearms inasmuch as the gas pressure at the gas port is not only generally higher than the normal gas pressure but it exists for a substantially longer period due to the time required to accelerate the substantial mass of the grenade. Under such conditions the gas actuating mechanism receives an excess of power which would cause it to open the action either too soon or too violently, in either case with resultant damage to the firearm.

To permit grenades to be launched from a firearm of the type described, internal, peripherally extending, slot-like recesses 415 are provided on the inside of unlocking ring 407 adjacent each of the radial holes 416 but on the opposite side of such holes with respect to the cam slots 411. Recesses 415 are so shaped with respect to the heads of the piston plugs 400 that rotation of the unlocking ring 407 by handguard 3 will bring the base 416 of recesses 415 directly over the top of each piston plug 400 when such plugs are in locked position. Thus the action is locked in its battery position and cannot be unlocked by the gas pressure developed within the barrel. Accordingly when it is desired to launch grenades from this improved rifle, a suitable grenade launching attachment (not shown) is secured to the muzzle end of the barrel and a grenade mounted thereon. The grenade launching blank cartridge is loaded into the barrel and the barrel returned to its battery position. Then the handguard 3 is rotated to bring the locking ring to the foregoing described grenade firing position wherein the piston plugs are locked against radial movement. Accordingly, the gas pressure developed in the launching of the grenade cannot achieve the unlocking of the action and hence the possibility of damage to the action is eliminated.

Any desired system of front and rear sights may be applied to this rifle. A conventional form of a rockover rear sight 116 is shown mounted in a dovetailed slot 117 provided in the top rear portion of breech block 10. A front sight 90 is removably secured to the muzzle end of barrel 30. The only requirement for such front sight is that it be readily removable to permit disassembly of the rifle, and that in reassembly the sight assumes substantially the same position. One suitable form of the front sight may utilize a radially movable key 91 which is driven by a screw 92 into a key slot 93 provided in barrel 30. The details of such sight however form no part of this invention.

Disassembly of this improved rifle may be readily accomplished without special tools or equipment. The disassembly steps are as follows:

Magazine 70 is removed by raising the depending projection 83 of magazine latch 76; stock ferrule 5 is loosened and slipped off the forward portion 2 of the stock 1. The trigger guard screws 8 are removed and trigger guard 7 is taken off. The rest of the action may then be freely removed from the stock 1. All elements assembled to the tube 20 may then be removed from the breech block by slight rotation of the tube 20 with respect to breech block, disengaging the interrupted threaded connection therebetween.

If it is desired merely to clean the locking mechanism 40, it is not necessary to remove front sight 90. Handguard 3 may be withdrawn rearwardly over the tube 20. Gas cylinder 560 is unscrewed from the threads on the barrel and moved forwardly. The retaining spring 403 is snapped out of engagement with piston plugs 400 and then the piston plugs 400 may be withdrawn radially. The unlocking ring will then be free to be moved forwardly of tube 20, thereby exposing all necessary surfaces for cleaning purposes. If it is desired to disassemble the barrel 30 and the operating spring 206 from tube 20, then the front sight 90 must be removed by unscrewing screw 92, whereupon the barrel may be withdrawn rearwardly out of tube 20. Spring retainer 203 is then rotated 90 degrees and withdrawn through the slots 205 in tube 20. The securing pin 22 in mounting ring 4 is then knocked out and the mounting ring and spring 206 may then be slipped off of tube 20.

An alternative form of locking mechanism 40 is disclosed in Figs. 6 and 7. This form will, for convenience, be hereafter referred to as the "jet action" lock. At the forward end of tube 20 in a thick walled portion 210 thereof, a pair of opposed transverse slots 213 are provided which cut completely through a portion of the inner wall of tube 20. Within each slot 213, a locking shoe 215 is pivotally mounted on a pin 214 which extends generally parallel to the axis of tube 20. The inner surface 216 of shoes 215 is arcuately shaped to snugly fit around cylindrical barrel portion 304.

An annular locking ring 306 of hardened steel is pressed onto barrel portion 304 and rests against a shoulder formed at the juncture of barrel portion 304 with larger diameter barrel portion 301. The external diameter of locking ring 306 is the same as that of barrel portion 301 and the length of locking ring 306 is proportioned so that when its forward wall engages the shoes 215, the barrel is positioned in proper headspace relationship to breech block 10.

Locking shoes 215 are shaped in such manner that limited pivotal movement thereof will carry the shoes out of the path of locking ring 306 on the barrel. The external periphery 217 of shoes 215 is shaped to lie substantially flush with the periphery of the portion 210 of tube 20 when each shoe 215 is pivoted outwardly to its unlocked position. A recess 218 is centrally milled in that portion of the shoe where the pin 214 passes through. A suitable torsion spring 219 is located in each recess 218, surrounding pin 214, and having one end 220 in engagement with the tube portion 210 and the other end 221 engaging its respective shoe 215. The springs 219 thus bias shoes 215 towards their locked position with respect to the barrel.

A gas baffle 228 is provided comprising an annular ring surrounding the barrel immediately forward of locking shoes 215. Baffle 228 engages the interior of tube 20 in bearing relation and prevents leakage of gas forwardly when shoes 215 are in their locked position. A pair of opposed longitudinal grooves 229 are provided in baffle 228 to permit passage of the gas forwardly when the locking shoes are pivoted to their unlocked position.

With this arrangement the shoes 215 can be unlocked by the direct action of the barrel gases thereon. Gas ports 34 are provided in the barrel 30, opening respectively immediately beneath the arcuate surfaces 216 of locking shoes 215. The impact of the jet of gases passing through ports 34 has sufficient force to rotate each locking shoe 215 to its unlocked position. To facilitate the action of the gases on the shoes 215, a generally conical or arcuate recess 222 may be provided in the surface 216 of each shoe 215, immediately over-lying gas port 34.

After moving shoes 215 to an unlocked position, the gas then flows forwardly through grooves 229 into gas cylinder 560. Gas cylinder 560 comprises an annular member having a large diameter rear portion 561 sliding in bearing relation on the forward end portion 210 of tube 20 and a small diameter forward portion 562 sliding in bearing relation on barrel portion 304. A barrel nut 565 is threadably secured to barrel portion 304 about a half-inch forwardly of the end of gas cylinder 560 so that gas cylinder 560 accelerates forwardly under the force of the gases and then picks up the barrel, moving it forwardly, by impact with nut 565.

In order to permit the described "jet action" locking arrangement to be manually unlocked, annular cam surfaces 240 are provided on the exterior of each opposed end of the shoes 215. A cam extension 563 is integrally formed on the gas cylinder 560, comprising an arcuate cross-section, rearwardly extending projection. The interior surface 564 of extension 563 is shaped to define a cam 566 which simultaneously engages cam surfaces 240 on shoes 215 as the gas cylinder moves forward. The gas cylinder 560 is moved forward manually by the handguard or forearm 3 which comprises a hollow generally cylindrical member mounted in surrounding relation to the forward end of tube 20 and abutting a shoulder 567 on the periphery of gas cylinder 560. Thus as gas cylinder 560 is manually moved forward, the locking shoes 215 are cammed out of locking position by cam extension 563. At the completion of the cammed movement of shoes 215, gas cylinder 560 moves into engagement with barrel nut 565 and further forward movement of the gas cylinder moves the barrel forwardly to open the action. This movement brings the relatively larger diameter periphery of locking ring 306 and then barrel portion 301 successively under the locking shoes 215, thus maintaining the shoes in their unlocked position even though cam extension 563 moves forwardly off cam surfaces 240 on shoes 215. Upon return of the barrel and gas cylinder to battery position, the locking shoes snap into locking position under the bias of springs 219.

The unlocking systems described thus far have had the common characteristic of permitting the gas to operate directly upon the locking arrangement. This is, of course, advantageous from the standpoint of simplifying construction and reducing weight. With extremely high-powered cartridges, however, and where the overall length of tube 20 is such that the gas port will be located close to the chamber end of the barrel, the modifications disclosed in Figs. 8, 11 and 21 may be more advantageous inasmuch as they provide a positive delay time before unlocking is initiated.

Figs. 8 to 10 disclose a delay type locking mechanism 40 which will hereafter be referred to as the "roller type." A breech block (not shown), a tube 20 and barrel 30 are provided which are substantially identical to the construction heretofore described. The forward portion 224 of tube 20 is of uniform interior diameter and has a thick walled portion 237 and a pair of diametrically opposed slots 225 are provided in such portion, the longitudinal axes of which are disposed in a plane substantially perpendicular to the axis of tube 20.

A hardened locking ring 310 is provided surrounding barrel portion 304 and abutting the shoulder formed by the juncture with larger diameter barrel portion 301. A pair of semi-cylindrical recesses 312 are provided in the rear portion of locking ring 310 respectively adjacent and parallel to slots 225 in tube 20. A pair of locking rollers 313 are provided comprising essentially cylindrical members which may move transversely through the slots 225 in tube 20 to snugly engage in the semi-cylindrical recesses 312 in locking ring 310. It will be apparent that when rollers 313 are retained in engagement in recesses 312 of locking ring 310, the barrel will be rigidly locked to the tube 20 and hence be in safe condition for firing. Any forward force on the barrel, however, tends to cam the rollers 313 outwardly to an unlocked position.

The position of rollers 313 is respectively controlled by a pair of cam rods 314 which in turn are operated by a gas cylinder 510. Gas cylinder 510 has a hollow cylindrical forward portion 511, constructed to slide in bearing relationship on barrel portion 304. Rearwardly of bearing portion 511, the gas cylinder is of a larger diameter 512 and provided with a bore 513 permitting this portion of the gas cylinder 510 to engage the forward end portion 224 of the tube 20 in bearing relation. Cam rods 314 are each suitably secured, as by pins 311 in rearwardly opening holes 516 provided in large diameter portion 512 of gas cylinder 510. The center portion 315 of each roller 313 is of reduced diameter and the width of cam rods 314 is such as to permit the rods to freely engage center portion 315 of rollers 313. The surfaces of cam rods 314 respectively adjacent the rollers 313 control the positioning of such rollers and hence control the locking and unlocking of the action. The locking portion 316 of cam rods 314 is located immediately adjacent gas cylinder 510 and extends rearwardly past rollers 313 for a distance proportional to the amount of pre-unlocking delay time desired. Then an inclined cam surface 317 connects locking surface 316 with an unlocking surface 318 on each of cam rods 314. If no other means are provided to retain rollers 313 within tube 20, then it is necessary that the unlocking portion of cam rods 314 extend rearwardly a distance not less than the full stroke of the barrel 30. The ends of cam rods 314 may, therefore, be conveniently attached to the projections 204 provided on spring retainer 203. Hence operating spring 206 biases cam rods 314 and hence gas cylinder 510 rearwardly to their locked positions.

From the foregoing description it will be apparent that the initial forward movement of gas cylinder 510 with respect to tube 20 produces no change in the locked relationship of the barrel and the tube until the gas cylinder has moved sufficiently forward to bring unlocking surface 318 of cam rod 314 past the locking rollers 313. Thus a time delay of any desired magnitude may be produced between the firing of the cartridge and the unlocking of the action by proper proportioning of the length of the locking portion 316 and cam rods 314. A barrel nut 320 is threadably secured to barrel 30 sufficiently forward of gas cylinder 510 so that the gas cylinder will not contact nut 320 until locking rollers 313 are moved to their unlocked position. Thus gas cylinder 510 will pick up barrel 30 by striking the nut 320 and move the barrel forwardly.

With such a locking arrangement it is desirable to utilize expansion of the gases as the primary actuating force, inasmuch as the relatively long delay in unlocking may result in insufficient gas pressure within the barrel to drive the gas cylinder and barrel forwardly after unlocking. Such gas expansion feature may be conveniently applied to the described construction by providing a counterbore 514 in the intermediate portion of the rear large diameter section 512 of the gas cylinder 510. A gas port 36 may then be provided in barrel 30 and locking ring 310 which in the battery position of the barrel is disposed forwardly of the rear shoulder 515 formed in gas cylinder 510 at the juncture of bore 513 with the counterbore 514. A suitable radial passage 226 is provided in tube 20 in alignment with gas port 36.

With this arrangement a portion of the gases developed in the barrel will enter the gas cylinder 510 through gas port 36 and will operate on gas cylinder 510 to drive it forwardly. However, after limited forward movement of gas cylinder 510, and before the pressure within the barrel 30 has decreased substantially, the shoulder 515 of the gas cylinder will override the gas passage 226 in tube 20, thereby effectively providing a sealed-off gas chamber within the gas cylinder 510. Thus the gases will continue to operate by expansion to accelerate the gas cylinder 510 forwardly, thereby unlocking locking rollers 313 and picking up the barrel 30 by collision with barrel nut 320. Just beyond this point the rear end of gas cylinder 510 will pass off the forward end of tube 20 and exhaust the residual gases. The barrel, however, has received sufficient acceleration to carry it to its extreme forward position as illustrated in Fig. 9, compressing operating spring 206.

On the return stroke operating spring 206 functions on barrel 30 through the engagement of gas cylinder 510 with the forward end of locking ring 310. The cam surfaces 317 on cam rods 314 will therefore strike the rollers 313 prior to the barrel reaching its battery position. While this interrupts the spring action of operating spring 206 upon the barrel, the barrel, due to its large mass, has more than sufficient momentum to permit it to coast into its battery position. Hence a spring bias will be maintained on the rollers 313 which will snap them into locked position in the recesses 312 when the barrel coasts into its battery position.

*Quantity production models—gas operated, positive lock, automatic rifles*

Referring to Figs. 11 through 25, there will now be described modifications of this invention comprising gas operated, positive lock, automatic firearms which have been designed in such manner as to be readily adaptable to quantity production, inasmuch as all of the major elements of the rifle are either cylindrical components or stampings.

As in the previous constructions, a breech block 120 (Figs. 11 and 13) is threadably secured to the rear end of a hollow tube 20 and a barrel 30 reciprocates within tube 20. The rear portion of tube 20 is identical to that previously described, being provided with magazine slot 21 and cartridge ejection slot 23 (Fig. 14). The breech block 120, however, has been substantially modified to make it more readily manufacturable. Breech block 120 now comprises a cylindrical member having an axial threaded recess 121 (Figs. 11 and 13) in its forward end to accommodate the threaded rear end of tube 20. The cooperating threads between recess 121 and tube 20 are preferably of the interrupted type, permitting full engagement of the threads by limited rotation of the tube 20 relative to the breech block 120. In the center of the base of recess 121, a cylindrical cartridge seating recess 122 is provided. An axial firing pin opening 123 (Figs. 11 and 17) is provided through breech block 120, having an enlarged, rearwardly opening, counterbored portion 124 which accommodates the enlarged head 126 of a firing pin 125. A firing pin spring 127 operates between the head 126 of the firing pin and the base of the counterbore 124. Firing pin 125 is retained in breech block 120 by means of a washer 113 (Fig. 17) which is secured by a bolt 118 in a recess 114 on the rear face of breech block 120. Washer 113 engages a rearwardly facing shoulder 119 formed by milling a longitudinal flat on the head portion 126 of firing pin 125.

A magazine support 150 (Figs. 11, 12, and 14) is provided which may be conveniently formed by stamping of sheet metal. Magazine support 150 is preferably formed in two halves divided by a plane passed vertically through the barrel axis of the firearm and then the two half portions are welded together. The magazine support includes a rear cylindrical portion 151 constructed to fit snugly around breech block 120. Magazine support 150 has also a forward cylindrical portion 152 which is constructed to snugly engage the periphery of tube 20. The central portion 153 (Fig. 13) of the magazine support comprising spaced, longitudinally extending walls is shaped to define a magazine recess into which a magazine 164 may be snugly inserted. On each side of the central portion 153, there are respectively provided a forward web portion 155 and a rear web portion 156 (Fig. 11). The two half sections from which the magazine support 150 is formed may be conveniently secured together by spot welding in the forward web portion 155 and by welding the two halves of the rear web portion 156 to a spacer block 157 thus defining a channel 158 (Fig. 14). A magazine latch 159 may be conveniently mounted in the channel 158 by means of a pin 160 passing through a suitable hole in the magazine latch 159.

The rear cylindrical portion 151 of magazine support 150 is suitably secured as, for example, by spot welding to the breech block 120. A pair of spaced vertical ears 165 (Fig. 11) are formed from the rear cylindrical portion 151 projecting above the breech block 120 to form a bracket for mounting a rear sight 167. Likewise a pair of spaced upstanding ears 168 (Fig. 14) are formed from the forward cylindrical portion 152 of magazine support 150 to provide a mounting bracket for a cartridge locator 169 that is fully described in my copending application for Firing Mechanism for Automatic Firearms, Serial No. 59,324, filed November 10, 1948. The magazine 164 when latched in position in the magazine recess projects upwardly into a correspondingly shaped opening 21 (Fig. 14) provided in the tube 20.

Up to this point the barrel 30 has been described as an integral member similar to the construction shown in previously described modifications and obviously the locking and gas systems already described may be utilized. The previously described modifications all utilized a relatively small gas cylinder to move the barrel forwardly and the total weight of such gas cylinder was only a small fraction of the weight of the barrel. This construction, therefore, requires that considerable gas be admitted to the cylinder and permitted to operate upon the cylinder after the cylinder had picked up the barrel in order that sufficient energy could be imparted to the barrel to move it to its extreme forward position. It would be obviously desirable to provide a construction wherein the weight of the gas cylinder was a substantial proportion of the weight of the barrel. Such objective has been accomplished in the modified form of barrel and locking mechanism now to be described, without increasing the overall weight of the gun or decreasing the effective weight of the barrel.

As shown in Figs. 11 and 13, the barrel may be said to be formed in two pieces, comprising a relatively thin-walled barrel portion 325, which includes the chamber 326 and a rifled bore 327, and a barrel operating sleeve 328 which slidably surrounds the rear portion of the barrel element 325, running from a point approximately one-half inch forwardly of the chamber and to at least a point beyond the forward end of the tube 20. The total mass of the barrel element 325 and barrel sleeve 328 is selected to be not less than the mass of the integral barrel utilized in the previous modifications. It is apparent, therefore, that so far as rigidity of the barrel for bayonet work, heat resistance of the barrel under continued firing, and the cyclic rate of automatic fire of the weapon are concerned, this two-piece barrel construction will function equally as well as the previously described integral construction. As a matter of fact the cooling rate of such barrel will be somewhat greater inasmuch as relative movement (which will be described) between the sleeve 328 and the barrel element 325 permits exposure of a hotter portion of the barrel for air-cooling, yet does not impair the loss of heat from the barrel by conduction.

Barrel element 325 is formed with essentially three distinct diameters, the largest diameter portion 329 comprises the extreme rear end of the barrel element 325 and is of such diameter as to permit large diameter portion 329 to cooperate in bearing relationship with the uniform diameter bore 230 of the tube 20. This large diameter portion 329 is of limited length, being just long enough to accommodate the threaded hole in which the cocking rod 600 is secured into the barrel. Next, an intermediate diameter portion 330 is provided which preferably extends forwardly to a point beyond the forward end of the magazine opening 21 in tube 20. Finally, the remainder of the forward portion of the barrel element 325 is preferably of substantially uniform small diameter 331. A substantial sized forwardly facing shoulder 332 is thereby formed at the juncture of diameter portions 330 and 331 which will be utilized as a locking shoulder for the barrel. It is desired to point out that while shoulder 332 is preferably located to lie forwardly of the magazine opening in the tube when the barrel is in its battery position, in some applications of this invention it may be desirable to move such shoulder back further along the barrel. This, of course, has the effect of moving the point of locking of the action closer to the face of the breech member.

The barrel sleeve 328 has a uniform exterior diameter 333 which cooperates in bearing relationship with the uniform diameter bore 230 of the tube 20. The bore of sleeve 328 is formed in two diameters, a rearward large diameter portions 334 which cooperates with the intermediate portion of the barrel element 325 and a forward smaller diameter portion 335 (Fig. 11) which cooperates in bearing relationship with the small diameter portion 331 of the barrel element 325.

The extreme forward end of barrel sleeve 328 is provided with threads 336 which project beyond the end of tube 20. An annular gas cylinder 520 is provided with a forward threaded portion 517 which engages the thread 336 on barrel sleeve 328 and a rearwardly extending cylinder portion 518 which cooperates in bearing relationship with a bushing 231 which is secured by a key 363 to the forward end of tube 20. Thus in effect the gas cylinder is supplied with a mass that is a substantial proportion of the mass of the barrel element 325.

The barrel element 325 is locked to the tube 20 by means of a locking element 340. Locking element 340 has an annular base portion 341 (Fig. 18) which fits freely over the small diameter portion 331 of barrel element 325 and within the rear large diameter portion 334 of the sleeve 328 (Fig. 19). Two diametrically opposed locking projections 342 are integrally provided on the annular portion 341 projecting outwardly through cam slots 343 in barrel sleeve 328 (Figs. 11, 13, 15, 18 and 19) and into locking slots 232 in tube 20. Locking slots 232 (Fig. 15) have parallel portions 233 extending forwardly along tube 20 for a distance greater than the desired forward movement of the barrel element 325 and terminating in wider assembly slots 235. The rear end of locking slots 232 are provided with helical locking portions 234 which are peripherally offset with respect to the parallel portion 233 thus defining rearwardly facing locking surfaces 236.

The locking projections 342 are each provided with a helical locking surface 344 (Fig. 18) which are brought into engagement with the corresponding locking surface 236 of locking slots 232 by rotation of the locking element 340 with respect to the barrel element 325. The cam slots 343 in barrel sleeve 328 accomplish the rotation of the locking element between its locked and unlocked positions by engagement with camming surfaces 353 (Fig. 18) provided on the locking projections 342 of the locking element 340. Cam slots 343 are shaped to define a forward wide assembly portion 337 (Fig. 11), and a straight, narrow rearwardly extending "dwell travel" portion 345 which terminates in a helical cam portion 346. Barrel sleeve 328 is biased against rotation by key 363 (Fig. 11) inserted through the wall of tube 20 and bushing 231 and engaging in a longitudinal key slot 362 provided in barrel sleeve 328. Thus the barrel sleeve 328 must be first moved forwardly with respect to barrel element 325 by gas cylinder 520 for a distance determined by the length of "dwell travel" portions 345 of cam slots 343. Then the continued forward movement of barrel sleeve 328 will rotate locking elements 340 by engagement of the helical cam portions 346 in the sleeve with correspondingly shaped cam portions (not shown) provided on the locking element 340. Further forward movement of barrel sleeve 328 brings its front end into engagement with a barrel nut 360 (Fig. 12) threadably secured to barrel element 325. Thus the barrel element 325 is picked up and carried to its extreme forward position by the barrel sleeve 328. The locking projections 342 are made sufficiently long so as to project out of the tube 20 and the projecting ends thereof may thus be utilized as a seat for the operating spring 206. Operating spring 206 is thus compressed by forward movement of barrel element 325. The front end turn of spring 206 seats in a slot 364 in key 363, thus retaining the key in position. To cushion the impact between barrel sleeve 328 and nut 360, a spring 361 may be provided operating therebetween. Spring 361 also assists in returning sleeve 328 to its battery position after barrel element 325 is locked. In addition, a buffer ring (not shown) of fibrous or plastic material may be mounted between barrel sleeve 328 and barrel nut 360 to cushion the impact.

The return movement of barrel element 325 and sleeve 328 is produced by operating spring 206. When the locking projections 342 reach the end of the parallel slot portions 233 in tube 20, initiation of rotation of locking element 340 is produced by the radius 233a joining slot portions 233 with helical locking slots 234. The completion of rotation of locking element 340 is then accomplished by the helical cam slot portions 346 in sleeve 328.

Assembly of tube 20, barrel 325, barrel sleeve 328, and locking element 340 is accomplished prior to screwing breech block 120 into tube 20. Barrel sleeve 328 is inserted in tube 20 and assembly slot portions 235 of the tube are aligned with assembly slot portions 337 of the sleeve. Locking element 340 is then turned 90 degrees from its normal position, inserted through the assembly slots, and then rotated 90 degrees back to its normal position. Barrel element 325 may then be inserted through the assembly from the rear thereof with barrel portion 330 passing through the annular portion 341 of the locking element.

To eliminate the necessity for a high degree of precision in the longitudinal location of locking slots 232 relative to the barrel locking shoulder 332, a headspace washer 338 is provided between barrel locking shoulder 332 and locking element 340. The headspacing of the firearm may then be readily and conveniently accomplished by selection of the thickness of washer 338. Washer 338 is preferably formed of an anti-friction metal such as brass, to facilitate rotation of locking element 340.

In operation, after the firing of a cartridge barrel sleeve 328 is moved forwardly by gases supplied to gas cylinder 520 through barrel port 348 and a hole 349 in barrel sleeve 328 which are aligned in the battery position. After limited forward movement of barrel sleeve 328, the hole 349 moves out of alignment with barrel port 348 and hence seals off barrel port 348. Thus a sealed, expansion chamber is provided within gas cylinder 520, permitting the gases trapped therein to expand and accelerate gas cylinder 520 forwardly, independent of the rapid drop in barrel bore pressure, until the rear end of gas cylinder 520 passes off the forward end of bushing 231. It will be noted that a large exhaust passage area is thus opened, insuring complete exhaust of the gases and thereby reducing the tendency for deposits of carbon to form within the gas cylinder.

The sealing-off feature of the gas system permits the launching of grenades without special safety arrangements inasmuch as the operation of the gas system is independent of the length of time that pressure is maintained within the barrel bore.

A slot 354 is provided in the top surface of barrel sleeve 328 overlying a groove 321 in barrel element 325 which operates cartridge locator 169. Thus cartridge locator 169 serves to maintain barrel element 325, barrel sleeve 328, and tube 20 in fixed rotational alignment in all positions of barrel element 325.

The simplicity of construction and the functional advantages of the locking system just described are deemed to be obvious. Without detracting from the effective weight of the barrel, the described locking arrangement imparts to the gas cylinder an effective mass which is a substantial portion of the mass of the barrel element. Thus the acceleration of the gas cylinder 520 to a moderate velocity will store sufficient kinetic energy in such cylinder to insure that the barrel element 325 will be moved to its extreme forward position. The locking element 340 serves the dual purpose of a lock and a spring seat. It should also be noted that the length of the "dwell" period of this improved action for design purposes may be made extremely long merely by increasing the length of the straight portion 345 in cam slots 343, and moving back the unlocking portions 346 relative to the battery position of locking element 340. In contrast to conventional firearms of the gas operated, rotary bolt type, a long "dwell" period may be achieved without increasing the overall length of the firearm.

Any desired form of quick detachable front sight may be utilized with this improved firearm. There is shown in Fig. 12 a front sight 94 comprising a hollow cylindrical body portion 95 which snugly surrounds the forward end of the barrel. An upstanding web portion 96 is provided on which a front sight blade 97 is pivotally secured. Body portion 95 is also provided with a rearwardly extending alignment portion 98 which cooperates with a plane surface 339 provided on the barrel 30 to maintain the eight in fixed angular relationship with respect to the barrel. The sight 94 is secured to the barrel by means of a flash hider 99 which is threadably secured on threads 322 at the extreme end of the barrel. Flash hider 99 abuts front sight 94 and thus prevents its removal. Preferably a depending bayonet lug 323 is integrally formed on the bottom of body portion 95 of sight 94 while the flash hider 99 is provided with a forwardly projecting reduced diameter annular portion (not shown). Thus a bayonet may be mounted to the gun in conventional fashion through the cooperation of the customary slot provided in such bayonet (not shown) with the bayonet lug 323, and the bayonet ring (not shown) with the annular portion of the flash hider.

The stock 86 utilized with this improved firearm is preferably of the straight line type, that is, no drop is provided, thereby increasing the stability of the weapon under full automatic firing conditions.

A pistol grip (not shown) is preferably provided which is secured to the bottom portion of the stock behind the trigger by suitable screws. The handguard 25 utilized in this modification comprises a substantially semi-circular channel member of suitable wood or plastic which surrounds all of the tube or receiver 20 forwardly of magazine support 150. Handguard 25 beds upon the forward portion of the stock 86 and is secured to the stock by a suitable split ring type metallic ferrule member 26 which surrounds both the stock 86 and handguard 25. To facilitate manual operation of the firearm action, the handguard and stock are preferably terminated rearwardly of at least a portion of the gas cylinder 520. A heat insulating sleeve 521 (Fig. 11) of suitable material is suitably secured to gas cylinder 520 in surrounding relationship, permitting the cylinder to be grasped by the hand of the operator and thus the firemerely by manually pushing the gas cylinder 520 forwardly.

Assembly and disassembly of this modification is essentially similar to the procedure heretofore described. It is necessary to remove the front sight 94 only when it is desired to completely separate the barrel element 325 from the tube and operating sleeve. After removal of the barrel nut 360 and front sight 94, the barrel element 325 may be moved rearwardly out of tube 20. Locking element 340 may then be disassembled by rotating it 90 degrees and withdrawal through the cam slots 343 in barrel sleeve 328 and through the locking slots 232 in tube 20.

It should be noted that the construction described is particularly adaptable for large quantity production inasmuch as all of the major elements are of cylindrical configuration such as the breech block 120, the tube 20, the barrel element 325, the barrel sleeve 328, the gas cylinder 520 and the handguard 3, or may be produced from stampings, such as the magazine support 150 and trigger guard 53.

Referring to Figs. 20-25 there is disclosed a further modification of this invention comprising a receiver or tube 720 threadably secured at its rear end to a breech block 700. Tube 720 is generally very similar in configuration to those utilized in the other modifications of this invention (see for example Fig. 15) and comprises a long tubular member having a uniform diameter, interior bore 723 and extends forwardly from the breech block for a distance approximately equal to one-half the length of the barrel. Approximately the rear one-half portion of the tube has a substantial wall thickness as represented by the large diameter portion 724. The forward portion 725 (Fig. 21), however, has as thin a wall section as consistent with the required strength of the component. Ejection slot 726 (Fig. 20) is provided in the rear top portion of the large diameter section 724 of the tube and a magazine slot (not shown) is provided in the bottom of such tube portion.

Longitudinally extending slots 830 (Fig. 21) are provided in the forward end of the tube 720 to accommodate the radially projecting arms 841 of an annular locking element 840. The slot 830 runs from the forward end of the large diameter tube portion 724 to a point just short of the forward end of the small diameter portion 725 of the tube 720. The rear end of the slot 830 is extended transversely along a helical angle, approaching 90 degrees, to define a rearwardly facing locking shoulder 831. A camming radius 830a is provided at the juncture of the straight and helical slot portions which initiates rotation of locking element 840 to its locked position. The forward ends of the slots 830 are widened to provide assembly portions 832.

The barrel 730 utilized in this modification is of extremely simple configuration, comprising a rear maximum diameter portion 732 (Fig. 21) extending from the face of breech block 700 to a point just short of the location of the locking shoulder 831 in the tube 720; next, a forwardly extending reduced diameter portion 733 which extends forwardly to a point beyond the end of tube 720 and terminates in a threaded portion 734 to which a barrel nut 735 is secured, and then a decreasing diameter tapered portion 736 (Fig. 20) terminating in suitable threads upon which the flash hider 99 is mounted.

The maximum diameter portion 732 of the barrel engages the bore 723 of the tube 720 in bearing relation. The barrel is supported forwardly on its reduced diameter portion 733 by a barrel bearing 834 (Fig. 21) which is brazed or otherwise suitably secured in the forward end of tube 720.

Immediately to the rear of the muzzle end of the barrel, a flat 737 (Fig. 20) is formed on the barrel. A sight 94 and flash hider 99 are mounted on the forward end of the barrel 730. These elements are identical to those previously described in connection with the modification shown in Fig. 12.

The forwardly facing shoulder 738 (Fig. 21) formed at the juncture of maximum diameter barrel portion 732 with reduced diameter barrel portion 733 is utilized as a locking shoulder. The annular locking element 840 is slipped over barrel portion 733 and abuts against locking shoulder 738 through a headspace washer 844 of selected thickness. The radially projecting arms 841 of locking element 840 (Fig. 25) each have a helical locking portion 842 formed thereon which cooperates with locking shoulder 831 in the tube 720. The arms 841 project radially beyond the maximum diameter portion 724 of the tube and the projecting ends thereof are provided with helical camming surfaces 843 which are engaged by suitable camming slots 745 provided in an operating sleeve 740.

In contrast with the modification disclosed in Fig. 11, the operating sleeve 740 (Figs. 21 and 24) is mounted in surrounding relationship to the forward end of the tube 720. This construction has two advantages: first, an improved leverage condition for producing rotation of locking element 840; secondly, less frictional resistance to movement of the operating sleeve.

The operating sleeve 740 comprises an elongated tubular portion having three stepped interior and exterior diameter portions. The rearward portion 741 is of largest diameter and is constructed to surround the forward end of large diameter portion 724 of tube 720. The wall thickness of portion 741 is preferably somewhat greater than the rest of the operating sleeve due to the fact that this portion contains the cam slots 745; next, is an intermediate diameter portion 742 which is constructed to surround the forward reduced diameter portion 725 of tube 720 in bearing relation; finally, the extreme forward portion 743 of operating sleeve 740 is of the smallest diameter and is constructed to engage barrel portion 733 in bearing relation. The shoulder 744 formed at the juncture of intermediate portion 742 and forward portion 743 of operating sleeve 740 defines a gas cylinder wall for the gun.

As has already been mentioned, a pair of opposed helical camming slots 745 (Fig. 24) are provided in the rear portion 741 of the operating sleeve 740 which cooperate with the cam portions 843 of the locking element 840. Connecting with each cam slot 745 is a longitudinal slot 746 comprising a "dwell travel" slot and at the forward end of the "dwell travel" slots, there is provided enlarged assembly slot portions 747. A longitudinally extending key slot 748 (Figs. 21 and 22) is also provided in the rear portion 741 of the operating sleeve 740 which cooperates with a key 833 which is threadably or otherwise rigidly secured to the large diameter portion 724 of the tube 720. A longitudinally extending slot 749 is also provided in the bottom portion of operating sleeve 740 extending from a point a half-inch or more behind the gas cylinder shoulder 744 rearwardly for a distance somewhat greater than the total forward travel of the operating sleeve. In the assembled firearm, this slot surrounds a forearm bushing 785 (Fig. 21) which will be described in more detail later.

In the battery positions of the barrel 730 and the operating sleeve 740, the locking portions 842 of locking element 840 are rotated behind the locking shoulders 831 of tube 720 and the cam portions 843 of the locking element lie in the "dwell travel" slot 746 of the operating sleeve 740. In this position a slight clearance 835 (Fig. 21) is provided between the extreme forward end of tube 720 and the gas cylinder wall 744 which functions as a gas cylinder chamber. A gas port 739 is provided in barrel 730 communicating with this clearance. Hence upon discharge of a cartridge in the barrel, the gases will enter the gas cylinder chamber 835 and operate upon the gas cylinder wall 744 to drive the operating sleeve 740 forwardly.

After a suitable "dwell travel," which is selected in consideration of the pressure characteristics of the cartridge and the location of the gas port relative to the chamber to insure that the bore pressure is reduced to a safe value, the operating sleeve 740 moves sufficiently to bring the camming slots 745 into engagement with the cam portions 843 of the locking element 840. The locking element is thereupon rotated to an unlocked position in which the locking portions 642 lie in the longitudinal slots 830 in the tube 720. At this point, or slightly thereafter, the forward end of the operating sleeve 740 makes operative engagement with the barrel nut 735 and due to the high inertia of the operating sleeve, the barrel is picked up thereby and moved forwardly, initiating its automatic cycle. Preferably an annular buffer 825 is mounted on barrel portion 733 between barrel nut 735 and operating sleeve portion 740 to cushion the impact between the operating sleeve and the barrel. Likewise an annular buffer 202 may be provided around barrel portion 733 to absorb the impact between locking element 840 and barrel bearing 834. A spring 361 is mounted between buffer 825 and the forward end of operating sleeve 740 and provides a force urging operating sleeve to its battery position relative to the barrel.

A magazine support 850 is provided which is somewhat similar to the magazine support 150 described in connection with the modification shown in Figs. 11, 13, and 14. Magazine support 850 is preferably formed from two pressed metal half parts which in assembly lie respectively on each side of a plane passing vertically through the barrel axis of the firearm.

The central portion 858 of magazine support 850 comprises spaced walls which are shaped to define a magazine recess (not known) into which a magazine 164 may be snugly inserted.

On each side of the central portion 858 of the magazine support, there are respectively provided a forward web portion 862 and a rear web portion 863. The two half sections from which the magazine support 850 is formed may be conveniently secured together by spot welding in the forward web portion 862 and by welding the two halves of portion 863 to a spacer block (not shown) which thus defines a channel (not shown).

A straight line stock 770 is preferably utilized with this firearm being provided with a conventional butt plate 884 and a sling swivel 885 may be suitably secured to the bottom portion of stock 770. It will be apparent that, while stock 770 may be fabricated from wood, it is readily adapted to fabrication from molding of a suitable plastic material. A metallic pistol grip member 886 is provided, preferably of a U-shaped cross section, and arranged with its open portion facing the rear. A trigger guard 53 is provided which may be conveniently formed by stamping comprising an elongated strip-like member.

The forearm 780 may be conveniently formed from either wood or plastic and comprises a longitudinally extending member of generally rectangular exterior cross-section and having a longitudinal bore 781 which freely surrounds operating sleeve 740. The forearm is secured to the firearm at two points. At the rear of the forearm, a transverse hole 782 is provided in the top portion thereof which in assembly aligns with transverse holes (not shown) provided in the forward portion of the magazine support 850.

Near the forward end of the forearm, and preferably in the bottom thereof, a forearm bushing 785 (Figs. 21 and 23) is pressed or otherwise rigidly secured in the wall of the forearm and projects upwardly through the slot 749 in operating sleeve 740 into engagement with the bottom of the forward, reduced diameter portion 725 of the tube 720. The top surface 786 of forearm bushing 785 is arcuately shaped to snugly engage the periphery of the tube portion 725. The bushing 785 comprises an inverted cup-shaped member having a large cylindrical bore 787 open at the bottom thereof and a generally rectangular slot 783 passing through its base portion. A forearm retaining plunger 784 cooperates between forearm bushing 785 and tube 720 to secure the forearm and tube together. The plunger 784 is provided with a cylindrical head portion 826, an intermediate cylindrical shank portion 827 and at its upper end, a generally rectangular latch portion 828. The latch portion 828 is constructed to pass through the rectangular slot 783 and through an aligned rectangular slot 836 which passes through both the wall of tube 720 and barrel bearing 834. A spring 29 is mounted in surrounding relation to shank portion 827 and operates between the base of the bore 787 of the forearm bushing and the head portion 826 of the plunger. A cylindrical counterbore 837 is provided in the interior wall of barrel bearing 834 is alignment with the rectangular slot 836. The counterbore 837 is of sufficient depth so that when the rectangular latch portion 828 of the plunger is inserted through the slot 836, the entire plunger can be rotated 90 degrees, the latch portion 828 rotating within the counterbore 837 to seat in a circumferential groove 838 provided in the interior wall of barrel bearing 834. Thus the forearm and tube 720 are securely latched together. To disassemble, it is only necessary to push forearm retaining plunger 784 upwardly, so that the latch portion thereof enters the counterbore 837, then rotate the plunger 90 degrees and withdraw it through rectangular slot 836. A front sling swivel 839 is preferably pivotally mounted to the projecting end of the head portion 826 of the forearm retaining plunger 784. Swivel 839 thus provides a convenient handle for manual operation of the retaining plunger.

A manual operating handle 829 may be secured to operating sleeve 740 at any convenient point, such for example, as by welding it to the forward reduced diameter portion 743 of operating sleeve 740. A longitudinal slot 789 is provided in forearm 780 to accommodate operating handle 829.

In the last modification described, there has been incorporated one structural feature which can be advantageously utilized to produce an additional forward acting force on the barrel to assist the forward movement thereof after unlocking has been effected. This feature arises from the location of the breech block face (not shown) within a recess in the breech block 700. Since the tube 720 is threadably secured in the threaded recess of the breech block 700, and since the rear end of barrel 730 slides in bearing relation with respect to tube 720, then, in effect, a closed gas cylinder chamber is provided about the rear end of barrel 730 while it is in its battery position and for a distance of about one-half inch forward of its battery position. Furthermore, the barrel, in effect, constitutes a piston movable in such chamber.

If the "dwell" time of the firearm be made very small, by proportioning of the "dwell travel" slots 746 of operating sleeve 740, then it is possible to unlock the action while there is still a substantial gas pressure within the barrel, yet not sufficient pressure to produce a rupture of the cartridge case. As the barrel starts to move forwardly, the obturating seal of the cartridge against the barrel chamber is broken, and the residual gases can flow rearwardly around the cartridge case into the closed gas cylinder chamber defined by the tube, barrel, and breech block. Thus, such residual gas pressures can operate upon the substantial area of the end of the barrel, imparting a forward force thereto to assist the action of the operating sleeve 740.

*Gas operated, lockless automatic rifle*

It has already been mentioned that a firearm action built around a forwardly movable barrel, may, for some cartridges, permit a design wherein no positive lock is required between the barrel and the fixed breech member, the mass of the barrel being proportioned with respect to the forward forces on the barrel developed by the cartridge so that the barrel does not move forwardly any substantial amount until after the pressure within the barrel is reduced to a safe value. Figs. 26 and 27 illustrate a specific application of that phase of this invention to a firearm designed to fire medium powered cartridges such, for example, as the U. S. carbine, cal. .30, M1. This cartridge has sufficient power that a positive lock, rotating bolt-type action is commonly utilized to fire it. If, however, a conventional "blow-back" action were applied to this cartridge, the bolt would have to weigh on the order of two pounds. This would obviously prevent the successful design of a firearm for this cartridge where the maximum weight requirement is in the neighborhood of five pounds. However, by the application of this invention, a safe action is obtained having an overall weight of less than five pounds, even with a substantially heavier barrel than that commonly employed.

Referring to Figs. 26 and 27, the breech block 10, magazine 164, hammer 695, trigger 617, extractor (not shown), ejector (not shown), firing pin 100, cocking rods 755, hammer springs 795, operating spring 206, magazine latch 76, etc., are similar to those fully described in my co-pending application for Firing Mechanism for Automatic Firearms, Serial No. 59,324, filed November 10, 1948, however being of reduced dimensions proportional to the reduction in the size and energy of the cartridge. These components will therefore not be again described. The barrel 350 utilized in this modification is of exceedingly simple configuration having an enlarged diameter portion 351 at its rear end and a substantially uniform diameter portion 352 extending forward to the muzzle. The tube 250 is likewise of very simple configuration having a threaded portion 251 at the rear end thereof to threadably engage in the breech recess 11 and having an enlarged rear bore portion 252 and a smaller diameter forward bore portion 253 (Fig. 27), which portions cooperate in bearing relationship respectively with diametrical portions 351 and 352 of the barrel. A spring retainer 203 identical to that previously described is provided which seats against the shoulder 357 formed at the juncture of barrel portions 351 and 352. Preferably an additional operating spring 206 is provided functioning between spring retainer 203 and a ring-like member 254 secured on the forward end of tube 250 and thus supplementing the resistance of hammer springs 795 to forward movement of the barrel. An annular buffer 202 may be provided surrounding barrel portion 352.

The extreme forward portion 255 of tube 250 is of uniform diameter and functions as a fixed piston with respect to a gas cylinder 550. Gas cylinder 550 is an annular member preferably having a forward, interiorly threaded portion 551 secured to a threaded portion 358 on barrel 350 and an enlarged rear bore portion 552 which slides over piston portion 255 of the tube in the battery position of the barrel. A gas port 359 is provided in barrel 350 communicating with the interior of gas cylinder 550. Gas port 359 is located on barrel 350 forwardly of the region wherein maximum gas pressure is developed. Alternatively, gas cylinder 550 may be connected to the barrel in a manner similar to the construction of Fig. 6, i. e., the cylinder may slide on barrel 350 and engage a suitable nut member secured to the barrel.

The mass of barrel 350 is selected by proportioning the dimensions thereof relative to the forward forces developed by the cartridge so that upon the firing of a cartridge, the inertia mass of the barrel is sufficient to insure very slow acceleration of the barrel under the forward forces of both the cartridge and the gas cylinder. The operating springs 795 and 206 of course are in opposition to such forward forces and hence reduce the amount of mass required in the barrel. Thus the barrel does not move forward any substantial distance until after the cartridge has passed out of the muzzle and the gas pressure is reduced to a safe value. The barrel, however, receives sufficient energy from the pressure forces acting on it and from gas cylinder 550 to insure that it will move out to its extreme forward position, thereby accomplishing extraction and ejection of the cartridge case and cocking of the hammer mechanism. The barrel is then returned rearwardly by compressed hammer springs 795 and operating spring 206, loading the top cartridge from magazine 164 whereupon the next round may be fired either automatically or semi-automatically depending on the condition of the trigger mechanism.

Thus by this design the entire mass of the barrel contributes to the safety of the automatic action and reduction of the rate of fire of the weapon. No additional heavy breech member is required, hence the over-all weight of the gun may be maintained or reduced over conventional actions even with a substantially increased barrel weight.

It is desired to point out that, depending on the cartridge design and characteristics, the gas cylinder may be eliminated or its forward action greatly supplemented by utilization of the residual gas pressure against the rear face of the barrel in the manner heretofor discussed in connection with other modilcations of this invention. Here, as in the other modifications, the rear end portion of the tube 250 surrounds the rear end of barrel 350 in gas sealing relationship. Thus when the barrel moves forwardly sufficiently to break the gas seal between the expanded cartridge and the interior surface of the chamber, the residual gases escape back past the cartridge and operate upon the rear end of the barrel as a piston, the breech block and tube acting as a gas cylinder with respect to the barrel. The effectiveness of this force, of course, depends upon the time required to break the cartridge obturation seal, which in this case is dependent upon the selected mass of the barrel.

It should be noticed that in all of the described modifications the barrel, even in battery position is floatingly supported in the tube and no non-symmetrical transverse forces are exerted on the barrel during the firing cycle as will be apparent to those skilled in the art, such mounting of the barrel greatly increases its accuracy by elimination of interference with the natural whip of the barrel. Thus the accuracy of moving barrel firearms embodying this invention surpasses many conventional weapons having barrels rigidly secured to the receiver.

It is desired to distinctly point out that various mechanisms disclosed herein may be advantageously applied to firearms utilizing actions other than the forwardly moving barrel type. Thus any or all of the locking mechanism constructions could be applied to firearms with conventional actions and it is intended that such applications of individual elements of this invention be included in the scope thereof.

It will, therefore, be apparent that application of the principles of this invention provides novel and improved firearm constructions which permit automatic firearm designs which are outstandingly characterized by a small number of parts and simplicity of configuration of such parts. Furthermore, due to the substantially reduced locking forces which are inherent in firearms embodying the principles of this invention, the individual components may be made much lighter without rendering the weapon unsafe and accordingly a substantial reduction of over-all weight of the firearm is achieved, which is particularly important in military applications.

I claim:

1. In an automatic firearm, a hollow tubular receiver, a breech member secured to the rear portion of said receiver, a barrel slidably supported in said receiver for forward movement relative to said breech member, means for locking said barrel to said receiver in the battery position of said barrel, means responsive to the gas pressure generated in said barrel by the discharge of a cartridge therein for unlocking said locking means to release said barrel from said receiver, said barrel having a gas port therein adjacent the forward end of said receiver, an annular gas cylinder member mounted for forward movement relative to said receiver and cooperating with said receiver to define a gas cylinder chamber communicating with said gas port, whereby said gas cylinder member is driven forwardly by the gas pressure, and means for connecting said annular member to said barrel whereby said barrel is moved forwardly after the unlocking thereof.

2. In an automatic firearm, a hollow tubular receiver, a breech member secured to the rear portion of said receiver, a generally cylindrical barrel slidably supported in said receiver for forward movement relative to said breech member, means for locking said barrel to said receiver in the battery position of said barrel, said barrel having a gas port therein adjacent the forward end of said receiver, an annular member mounted for forward movement relative to said receiver and cooperating with said receiver to define a gas cylinder chamber communicating with said gas port, whereby said annular member is driven forwardly by the gas pressure, said annular member including means for unlocking said locking means by the forward movement of said annular member, and means for connecting said annular member to said barrel after the unlocking thereof whereby said barrel is moved forwardly.

3. In an automatic firearm, a hollow tubular receiver, a breech member secured to the rear portion of said receiver, a barrel slidably supported in said receiver for forward movement relative to said breech member, means for locking said barrel to said receiver in the battery position of said barrel, means responsive to the gas pressure generated in said barrel by the discharge of a cartridge therein for unlocking said locking means to release said barrel from said receiver, said barrel having a gas port therein adjacent the forward end of said receiver, an annular gas cylinder member slidably mounted on said barrel for forward movement relative thereto, said gas cylinder member having an annular portion cooperating with the forward end of said receiver to define a gas cylinder chamber communicating with said gas port whereby said gas cylinder member is driven forwardly by the gas pressure, and a nut member secured to said barrel in the path of forward movement of said gas cylinder member whereby said barrel is moved forwardly by said gas cylinder member after the unlocking of said barrel.

4. In an automatic firearm, a hollow tubular receiver, a breech member secured to the rear portion of said receiver, a barrel slidably supported in said receiver for forward movement relative to said breech member, means for locking said barrel to said receiver in the battery position of said barrel, said barrel having a gas port therein adjacent the forward end of said receiver, an annular gas cylinder member slidably mounted on said barrel for forward movement relative thereto, said gas cylinder member having an annular portion surrounding the forward end of said receiver to define a gas cylinder chamber communicating with said gas port, whereby said gas cylinder member is driven forwardly by the gas pressure, said gas cylinder member including means for unlocking said locking means by the forward movement of said gas cylinder member to release said barrel from said receiver, and a nut member secured to said barrel in the path of forward movement of said gas cylinder member whereby said gas cylinder member contacts said nut member after effecting unlocking of said barrel to move said barrel forwardly.

5. In an automatic firearm, a hollow tubular receiver, a breech member secured to the rear portion of said receiver, a barrel slidably supported in said receiver for forward movement relative to said breech member, said receiver having a plurality of axially coplanar, radial holes spaced about the periphery and opening into the interior bore thereof, a generally cylindrical piston mounted in each of said holes for axial movement therein, resilient means urging said pistons inwardly, said barrel having a plurality of radial, axially coplanar gas ports therein and counterbored recesses concentric with each of said gas ports, said recesses being constructed and arranged to respectively receive the inwardly projecting ends of said pistons therein in the battery positions of said barrel and receiver, each of said pistons having a shoulder adjacent their outer ends, a manually operable unlocking sleeve mounted in surrounding relation on said tubular receiver adjacent said pistons, and a plurality of camming surfaces on said unlocking sleeve respectively engageable with said shoulder on said pistons, said camming surfaces being constructed and arranged to move said pistons radially outwardly by limited rotation of said sleeve in one direction.

6. In an automatic firearm, a hollow tubular receiver a breech member secured to the rear portion of said receiver, a barrel slidably supported in said receiver for forward movement relative to said breech member, a locking element cooperating between said barrel and said receiver, said locking element being rotatable into locking relation with said receiver in the battery position of said barrel, an unlocking member mounted for movement relative to said receiver, said unlocking member including a cam engageable with said locking element and constructed and arranged to rotate said locking element to an unlocked position by movement of said unlocking member, and means responsive to the gas pressure developed by firing of a cartridge in the barrel for moving said unlocking member.

7. In an automatic firearm, a hollow tubular receiver, a breech member secured to the rear portion of said receiver, a barrel slidably supported in said receiver for forward movement relative to said breech member, a locking element cooperating between said barrel and said receiver, said locking element being rotatable into locking relation in said receiver in the battery position of said barrel, an unlocking sleeve mounted in surrounding relationship to said barrel for axial movement relative to said receiver, said unlocking sleeve having a cam slot therein engageable with said locking element and constructed and arranged to rotate said locking element to an unlocked position by movement of said unlocking sleeve, and means responsive to the gas pressure developed by firing of a cartridge in the barrel for moving said unlocking sleeve.

8. The combination defined in claim 7 wherein said last mentioned means comprises an annular gas cylinder member connected to said unlocking sleeve and cooperating with said receiver to define a gas cylinder chamber, said barrel having a gas port therein communicating with said gas cylinder chamber.

9. In an automatic firearm, a hollow tubular receiver, a breech member secured to the rear portion of said receiver, a barrel slidably supported in said receiver for forward movement relative to said breech member, a locking element cooperating between said barrel and said receiver, said locking element being rotatable into locking relation in said receiver in the battery position of said barrel, an unlocking sleeve mounted in surrounding relationship to said barrel for axial movement relative to said receiver, said unlocking sleeve having a cam slot therein engageable with said locking element and constructed and arranged to rotate said locking element to an unlocked position by movement of said unlocking sleeve, means responsive to the gas pressure developed by firing of a cartridge in the barrel for moving said unlocking sleeve, said last mentioned means comprising an annular gas cylinder member threadably secured to said unlocking sleeve and surrounding the forward end of said receiver, said gas cylinder member cooperating with said receiver to define a gas cylinder chamber, said barrel having a gas port therein, and said unlocking sleeve having a gas passage therethrough communicating between said gas port and said gas cylinder chamber.

10. In an automatic firearm, a hollow tubular receiver, a breech member secured to the rear portion of said receiver, a barrel slidably supported in said receiver for forward movement relative to said breech member, a locking element cooperating between said barrel and said receiver, said locking element being rotatable into locking relation with said receiver in the battery position of said barrel, an unlocking sleeve mounted in surrounding relationship to said barrel for axial movement relative to said receiver, said unlocking sleeve having a cam slot therein engageable with said locking element and constructed and arranged to rotate said locking element to an unlocked position by forward movement of said unlocking sleeve, means responsive to the gas pressure developed by firing of a cartridge in the barrel for moving said unlocking member forwardly, and means for connecting said unlocking sleeve to said barrel after sufficient forward movement thereof to unlock said locking element, whereby said barrel is moved forwardly by said unlocking sleeve.

11. The combination defined in claim 10 wherein the means for moving said unlocking sleeve forwardly comprises an annular gas cylinder member connected to said unlocking sleeve and cooperating with said receiver to define a gas cylinder chamber, said barrel having a gas port therein communicating with said gas cylinder chamber.

12. The combination defined in claim 10 wherein the means for moving said unlocking sleeve forwardly comprises an annular gas cylinder threadably secured to said unlocking sleeve and surrounding the forward end of said receiver said gas cylinder sleeve cooperating with said receiver to define a gas cylinder chamber, said barrel having a gas port therein, and said sleeve having a gas passage therethrough communicating between said gas port and said gas cylinder chamber.

13. In an automatic firearm, a hollow tubular receiver, a breech member secured to the rear portion of said receiver, a barrel slidably supported in said receiver for forward movement relative to said breech member, a locking element cooperating between said barrel and said receiver, said locking element being rotatable into locking relation with said receiver in the battery position of said barrel, an unlocking sleeve mounted in surrounding relation to said receiver for axial movement relative thereto, said unlocking sleeve having a cam slot therein engageable with said locking element and constructed and arranged to rotate said locking element to an unlocked position by movement of said unlocking sleeve, and means responsive to the gas pressure developed by firing of a cartridge in the barrel for moving said unlocking sleeve.

14. In an automatic firearm, a hollow tubular receiver, a breech member secured to the rear portion of said receiver, a barrel slidably supported in said receiver for forward movement relative to said breech member, a locking element cooperating between said barrel and said receiver, said locking element being rotatable into locking relation with said receiver in the battery position of said barrel, an unlocking sleeve mounted in surrounding relation to said receiver for axial movement relative thereto, said unlocking sleeve having a cam slot therein engageable with said locking element and constructed and arranged to rotate said locking element to an unlocked position by movement of said unlocking sleeve, and means responsive to the gas pressure developed by firing of a cartridge in the barrel for moving said unlocking sleeve, said last mentioned means comprising an integrally formed gas cylinder portion on the forward end of said unlocking sleeve, said gas cylinder portion cooperating with said receiver and said barrel to define a gas cylinder chamber, said barrel having a gas port therein communicating with said gas cylinder chamber.

15. In an automatic firearm, a hollow tubular receiver, a breech member secured to the rear portion of said receiver, a barrel slidably supported in said receiver for forward movement relative to said breech member, a locking element cooperating between said barrel and said receiver, said locking element being rotatable into locking relation with said receiver in the battery position of said barrel, an unlocking sleeve mounted in surrounding relation to said receiver for forward axial movement relative thereto, said unlocking sleeve having a cam slot therein engageable with said locking element and constructed and arranged to rotate said locking element to an unlocked position by movement of said unlocking sleeve, an integrally formed gas cylinder portion on the forward end of said unlocking sleeve, said gas cylinder portion cooperating with said receiver and said barrel to define a gas cylinder chamber, said barrel having a gas port therein communicating with said gas cylinder chamber whereby said unlocking sleeve is moved forwardly by the gas pressure developed by firing a cartridge in said barrel, and means for connecting said unlocking sleeve to said barrel after sufficient forward movement thereof to unlock said locking element, whereby said barrel is moved forwardly by said unlocking sleeve.

16. The combination defined in claim 6 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel.

17. The combination defined in claim 7 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel.

18. The combination defined in claim 9 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel.

19. The combination defined in claim 10 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel.

20. The combination defined in claim 13 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel.

21. The combination defined in claim 14 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel.

22. The combination defined in claim 15 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel.

23. The combination defined in claim 7 wherein said locking element has a radially projecting arm projecting into said cam slot in said unlocking sleeve.

24. The combination defined in claim 13 wherein said receiver has a longitudinally extending slot therein underlying at least a portion of said cam slot in said unlocking sleeve, and a radially projecting arm on said locking element projecting through said receiver slot and engageable in said cam slot.

25. The combination defined in claim 7 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel, one of said locking arms having a portion engageable in said cam slot of said unlocking sleeve whereby movement of said sleeve rotates said locking element about said barrel to and from a locking position.

26. The combination defined in claim 9 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel, one of said locking arms having a portion engageable in said cam slot of said unlocking sleeve whereby movement of said sleeve rotates said locking element about said barrel to and from a locking position.

27. The combination defined in claim 10 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel, one of said locking arms having a portion engageable in said cam slot of said unlocking sleeve whereby movement of said sleeve rotates said locking element about said barrel to and from a locking position.

28. The combination defined in claim 13 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel, each of said locking arms having an end portion respectively projecting radially through said receiver slots and at least one of said end portions being engageable in said cam slot of said unlocking sleeve whereby movement of said sleeve rotates said locking element about said barrel to and from a locking position.

29. The combination defined in claim 14 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel, each of said locking arms having an end portion respectively projecting radially through said receiver slots and at least one of said end portions being engageable in said cam slot of said unlocking sleeve whereby movement of said sleeve rotates said locking element about said barrel to and from a locking position.

30. The combination defined in claim 15 wherein said receiver is provided with a plurality of longitudinally extending slots, said slots having generally helical locking portions at the rear ends thereof, said locking portions each having a rearwardly facing locking shoulder, a forwardly facing shoulder on said barrel, and said locking element comprises an annular member rotatively surrounding said barrel and abutting said barrel shoulder, and a plurality of radially projecting locking arms on said annular member respectively slidably engageable in said receiver slots and respectively engaging said receiver locking shoulders in the battery position of the barrel, each of said locking arms having an end portion respectively projecting radially through said receiver slots and at least one of said end portions being engageable in said cam slot of said unlocking sleeve whereby movement of said sleeve rotates said locking element about said barrel to and from a locking position.

31. In an automatic firearm, a barrel, a tubular member disposed in generally surrounding relation to the barrel, said tubular member having a plurality of axially coplanar, radial holes spaced about the periphery and opening into the interior bore thereof, a generally cylindrical piston mounted in each of said holes for axial movement therein, resilient means urging said pistons inwardly, said barrel having a plurality of radial, axially coplanar gas ports therein and counterbored recesses concentric with each of said gas ports, said recesses being constructed and arranged to respectively receive the inwardly projecting end of said pistons therein in the battery positions of said barrel and tubular member, each of said pistons having a shoulder adjacent their outer ends, a manually operable unlocking sleeve rotatably mounted in surrounding relation on said tubular member adjacent said pistons, and a plurality of camming surfaces on said unlocking sleeve respectively engageable with said shoulders on said pistons, said camming surfaces being constructed and arranged to move said pistons radially outwardly by limited rotation of said sleeve in one direction.

32. In an automatic firearm, a barrel, a tubular member disposed in generally surrounding relation to the barrel, said tubular member having a plurality of axially coplanar, radial holes spaced about the periphery and opening into the interior bore thereof, a generally cylindrical piston mounted in each of said holes for axial movement therein, resilient means urging said pistons inwardly, said barrel having a plurality of radial, axially coplanar gas ports therein and counterbored recesses concentric with each of said gas ports, said recesses being constructed and arranged to respectively receive the inwardly projecting end of said pistons therein in the battery positions of said barrel and tubular member, each of said pistons having a shoulder adjacent their outer ends, a manually operable unlocking sleeve rotatably mounted in surrounding relation on said tubular member adjacent said pistons, and a plurality of camming surfaces on said unlocking sleeve respectively engageable with said shoulders on said pistons, said camming surfaces being constructed and arranged to move said pistons radially outwardly by limited rotation of said sleeve in one direction, said unlocking sleeve having other portions thereof disposed in overlying relation respectively to the outer ends of said pistons but angularly displaced from said pistons in a rotational direction opposite to that required to make said camming surfaces operative, whereby said pistons are secured in their inward position by limited rotation of said unlocking sleeve in said opposite direction.

33. In an automatic firearm, a barrel, a breech connected member disposed adjacent said barrel, a locking shoulder on said barrel, and a lock member pivotally mounted on said breech connected member and arranged to pivot into engagement with said barrel locking shoulder in the battery positions of said barrel and said breech connected member, said barrel having a gas port therein underlying said lock member and constructed and arranged to direct a gas blast against said lock member to pivot said lock member to its unlocked position.

34. The combination defined in claim 33 plus manually operable means for pivoting said lock member to its unlocked position.

35. In an automatic firearm, a barrel, a tubular breech connected member disposed in generally surrounding relation with respect to said barrel, a locking shoulder on said barrel, a pair of lock members pivotally mounted on said tubular member in opposed relation and arranged to pivot into engagement with said barrel locking shoulder in the battery positions of said barrel and said tubular member, said barrel having a pair of gas ports therein respectively underlying said lock members and constructed and arranged to direct a gas blast against the respective lock members to pivot said lock members to the unlocked positions, an operating member movably mounted on said tubular member, and an unlocking cam on said operating member engageable with said lock members, said unlocking cam being constructed and arranged to pivot said lock members simultaneously to an unlocked position by movement of said operating member.

36. In an automatic firearm, a hollow tubular receiver, a breech member secured to the rear portion of said receiver, a barrel slidably supported in said receiver for forward movement relative to said breech member, said receiver having a plurality of axially coplanar, radial holes spaced about the periphery and opening into the interior bore thereof, a generally cylindrical piston mounted in each of said holes for axial movement therein, resilient means urging said pistons inwardly, said barrel having a plurality of radial, axially coplanar gas ports therein and counterbored recesses concentric with each of said gas ports, said recesses being constructed and arranged to respectively receive inwardly projecting ends of said pistons therein in the battery position of said barrel and receiver, a gas cylinder member connected to said barrel and cooperating with the forward end of said receiver to define a gas cylinder chamber, gas passage means for interconnecting said gas cylinder chamber within said barrel recesses whereby said barrel is moved forwardly by gas pressure and said pistons are forced outwardly to an unlocked position, and manually operable means for retracting said pistons radially outwardly to an unlocked position relative to said barrel.

37. A firearm of the automatic type comprising, a tubular receiver, a breech member rigidly secured to the rear portion of said receiver, a barrel slidably mounted within said receiver and arranged to move forwardly with respect to said breech member, resilient means for biasing said barrel rearwardly to battery position where the chamber end thereof lies in abutting relation to said breech member, a spring retainer secured to said barrel, said receiver having a plurality of spaced longitudinal slots therein, said retainer having a plurality of arms respectively projecting out of said receiver slots, said resilient means comprising a helical spring surrounding said receiver and operating between said retainer arms and said receiver, said barrel having a gas port therein forwardly of the region wherein maximum gas pressure is developed, an annular gas cylinder member mounted for forward movement relative to said receiver and cooperating with said receiver and said barrel to define a gas cylinder chamber communicating with said gas port in the battery position of the barrel whereby said gas cylinder member is moved forwardly by the gases passing through said port, and means for connecting said gas cylinder member to said barrel so that the forward movement of said gas cylinder member is imparted to said barrel whereby said barrel is moved forwardly from said breech member a distance greater than the length of a cartridge case.

38. In an automatic firearm, a receiver, a breech member secured to the rear portion of said receiver, a barrel supported by said receiver for forward movement relative to said breech member, means for locking said barrel to said receiver in the battery position of the barrel relative to the breech member, means responsive to the gas pressure generated in said barrel by the discharge of a cartridge for unlocking said locking means to release said barrel from said receiver, a spring retainer secured to said barrel, said receiver having a plurality of spaced longitudinal slots therein, said retainer having a plurality of arms respectively projecting out of said receiver slots, and resilient means for biasing said barrel rearwardly to battery position including a helical spring surrounding said receiver and operating between said retainer arms and said receiver.

39. A firearm of the automatic type comprising a tubular receiver, a breech member rigidly secured to the rear portion of said receiver, a barrel of generally cylindrical configuration slidably mounted within said receiver and arranged to move forwardly with respect to said breech member, resilient means for biasing said barrel rearwardly to battery position where the chamber end thereof lies in abutment with relation to said breech member, a spring retainer secured to said barrel, said receiver having a plurality of spaced longitudinal slots therein, said retainer having a plurality of arms respectively projecting out of said receiver slots, said resilient means including a helical spring surrounding said receiver and operating between said retainer arms and said receiver, and a gas cylinder member threadably secured to said barrel in surrounding relationship, said gas cylinder member cooperating with the forward portion of said receiver to form a gas cylinder chamber in the battery position of said barrel, said barrel having a gas port therein forwardly of the region where maximum gas pressure is developed and communicating with said gas cylinder chamber whereby the gases flowing through said port impart a forward force to said gas cylinder member to move said barrel forwardly from said breech member a distance greater than the length of a cartridge case.

40. In an automatic firearm, a receiver, a breech member secured to the rear portion of said receiver, a barrel supported by said receiver for forward movement relative to said breech member, a forwardly facing locking shoulder on said barrel, a pair of locking members pivotally mounted on said receiver in opposed relation and arranged to pivot in engagement with said barrel locking shoulder in the battery position of said receiver, said barrel having a pair of gas ports therein respectively underlying said locking members and constructed and arranged to direct a gas blast against the respective locking members to pivot said locking members to their unlocked positions, and an operating member movably mounted on said receiver and an unlocking cam on said operating member engageable with said locking members, said cam being constructed and arranged to pivot said locking members simultaneously into an unlocked position by movement of said operating member to release said barrel from said receiver.

41. In an automatic firearm, a receiver, a breech member secured to the rear portion of said receiver, a barrel supported by said receiver for forward movement relative to said breech member, a roller mounted in said receiver for rolling movement in a substantially radial direction relative to said barrel, said barrel having a transverse locking recess therein to receive said roller in the battery position of said barrel, cam means for moving said roller into engagement with said barrel recess, and means responsive to the gas pressure generated in said barrel by the discharge of a cartridge for disengaging said roller from said recess to release said barrel from said receiver.

42. In an automatic firearm, a receiver, a breech member secured to the rear portion of said receiver, a barrel supported by said receiver for forward movement relative to said breech member, a roller mounted in said receiver for rolling movement in a substantially radial direction relative to said barrel, said barrel having a transverse locking recess therein to receive said roller in the battery position of said barrel, cam means for moving said roller into engagement with said barrel recess, a gas operated member movably mounted on the firearm, said gas operated member being operatively connected to said cam means to move said cam means to an unlocking position relative to said roller in response to firing of a cartridge in said barrel to release said barrel from said receiver.

43. In an automatic firearm, a receiver, a breech member secured to the rear portion of said receiver, a barrel supported by said receiver for forward movement relative to said breech member, a roller mounted in said receiver for rolling movement in a substantially radial direction relative to said barrel, said barrel having a transverse locking recess therein to receive said roller in the battery position of said barrel, cam means for moving said roller into engagement with said barrel recess, a gas operated member mounted on the firearm for forward movement relative thereto, said gas operated member being operatively connected to said cam means to move said cam means to an unlocking position relative to said roller in response to firing of a cartridge in said barrel, and means for connecting said gas operated member to said barrel after sufficient forward movement thereof to accomplish unlocking of said roller, whereby said barrel is moved forwardly by said gas operated member.

44. In an automatic firearm, a receiver, a breech member secured to the rear portion of said receiver, a barrel supported by said receiver for forward movement relative to said breech member, a forwardly facing shoulder on said barrel, an annular locking element rotatively surrounding said barrel and abutting said shoulder, a plurality of rearwardly facing locking shoulders on said receiver, a plurality of radially projecting locking arms on said annular locking element respectively engageable with said receiver locking shoulders in the battery position of said barrel, and means responsive to the gas pressure generated in said barrel by the discharge of a cartridge for unlocking said element to release said barrel from said receiver.

45. In an automatic firearm, a receiver, a breech member secured to the rear portion of said receiver, a barrel supported by said receiver for forward movement relative to said breech member, a forwardly facing shoulder on said barrel, an annular locking element rotatively surrounding said barrel and abutting said shoulder, a plurality of rearwardly facing locking shoulders on said receiver, a plurality of radially projecting locking arms on said annular locking element respectively engageable with said receiver locking shoulders in the battery position of said barrel, a washer interposed between said locking element and said forwardly facing shoulder, said washer having a thickness selected to produce proper headspacing relationship between said barrel and said receiver in battery positions thereof, and means responsive to the gas pressure generated in said barrel by the discharge of a cartridge for unlocking said locking element to release said barrel from said receiver.

WILBUR A. SCHAICH.

REFERENCES CITED

The following references are of record in the file of this patent:

UNITED STATES PATENTS

| Number | Name | Date |
|---|---|---|
| 666,084 | Burgess | Jan. 15, 1901 |
| 682,230 | Perino | Sept. 10, 1901 |
| 715,971 | Burgess | Dec. 16, 1902 |
| 877,657 | Mason | Jan. 28, 1908 |
| 918,380 | Schwarzlose | Apr. 17, 1909 |
| 958,545 | Ross | May 17, 1910 |
| 1,070,145 | Lewis | Aug. 12, 1913 |
| 1,173,161 | Barnes | Feb. 29, 1916 |
| 1,327,897 | Baldwin | Jan. 13, 1920 |
| 1,334,052 | Putnam | Mar. 16, 1920 |
| 1,376,456 | Moore | May 3, 1921 |
| 1,422,237 | Swebilius | July 11, 1922 |

(Other references on following page)

UNITED STATES PATENTS

| Number | Name | Date |
|---|---|---|
| 1,469,918 | De Maine | Oct. 9, 1923 |
| 1,564,014 | Pedersen | Dec. 1, 1925 |
| 1,672,540 | Page | June 5, 1928 |
| 1,755,034 | Stange | Apr. 15, 1930 |
| 1,878,039 | Von Frommer | Sept. 20, 1932 |
| 1,913,255 | Von Frommer | June 6, 1933 |
| 1,994,489 | Simpson | Mar. 19, 1935 |
| 2,248,015 | Whiting | July 1, 1941 |
| 2,296,729 | Mossberg | Sept. 22, 1942 |
| 2,345,127 | Kehne | Mar. 28, 1944 |
| 2,345,833 | Schirokauer | Apr. 4, 1944 |
| 2,372,542 | Bloomquist | Mar. 27, 1945 |
| 2,387,691 | Sunderland | Oct. 23, 1945 |
| 2,396,816 | Boudreau | Mar. 19, 1946 |

FOREIGN PATENTS

| Number | Country | Date |
|---|---|---|
| 38,004 | Germany | Dec. 27, 1886 |
| 497,303 | France | Sept. 9, 1919 |
| 225,759 | Great Britain | Dec. 1, 1924 |